United States Patent
Kadota et al.

(10) Patent No.: US 6,898,505 B2
(45) Date of Patent: May 24, 2005

(54) CONTROLLING A STARTING AND THE SUBSEQUENT VEHICLE ACCELERATION PROCEDURE

(75) Inventors: Keiji Kadota, Kanagawa (JP); Kouichi Shimizu, Kanagawa (JP); Hidetoshi Suzuki, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 19 days.

(21) Appl. No.: 10/425,982

(22) Filed: Apr. 30, 2003

(65) Prior Publication Data

US 2004/0030480 A1 Feb. 12, 2004

(30) Foreign Application Priority Data

May 2, 2002 (JP) ........................................ 2002-130257

(51) Int. Cl.[7] .............................. B06L 11/00; B60K 6/00
(52) U.S. Cl. ............................. 701/71; 701/69; 701/73; 701/84; 701/89; 701/90; 180/197
(58) Field of Search ............................. 701/54, 65, 69, 701/70, 71, 73, 84, 89, 90; 180/197

(56) References Cited

U.S. PATENT DOCUMENTS

| | | | |
|---|---|---|---|
| 5,047,941 A | * | 9/1991 | Seki ............................. 701/85 |
| 5,096,016 A | * | 3/1992 | Tada et al. ................... 180/197 |
| 5,164,903 A | * | 11/1992 | Lin et al. ....................... 701/89 |
| 5,464,084 A | | 11/1995 | Aoki et al. |
| 5,737,714 A | * | 4/1998 | Matsuno et al. ............... 701/89 |
| 5,765,657 A | * | 6/1998 | Fukumura et al. .......... 180/197 |
| 5,788,005 A | | 8/1998 | Arai |
| 5,839,535 A | | 11/1998 | Arai |
| 6,434,469 B1 | | 8/2002 | Shimizu et al. |
| 2003/0064858 A1 | | 4/2003 | Saeki et al. |

FOREIGN PATENT DOCUMENTS

| | | |
|---|---|---|
| JP | 5-131858 A | 5/1993 |
| JP | 8-207605 A | 8/1996 |
| JP | 8-300964 A | 11/1996 |
| JP | 8-300965 A | 11/1998 |
| JP | 11-125129 A | 5/1999 |

OTHER PUBLICATIONS

Service Manual, "Nissan March", issued Feb. 2002, by Nissan Motor Co., Limited, pp. C–6 to C–22.
Service Manual, "Nissan March", issued Sep. 2002 by Nissan Motor Co., Limited, pp. C–6 to C–13.

* cited by examiner

*Primary Examiner*—Richard M. Camby
*Assistant Examiner*—Eric M. Gibson
(74) *Attorney, Agent, or Firm*—Foley & Lardner LLP

(57) ABSTRACT

A system is provided, which controls a starting and the subsequent vehicle acceleration procedure of a motor vehicle. The system compares a predetermined variable that grows continuously during the starting procedure to a threshold value. It determines a first desired value of torque in response to operator demand, and a second desired value torque in response to acceleration slip. The system performs a feed-forward 4WD control in response to the first desired value of torque when the predetermined variable is lower than or equal to the threshold value. The system determines whether or not driving situation justifies a change from performing the feed-forward 4WD control to performing a feed-back 2/4WD control in response to the second desired value of torque.

19 Claims, 11 Drawing Sheets

CONTROLLING A STARTING AND THE SUBSEQUENT VEHICLE ACCELERATION PROCEDURE

BACKGROUND OF THE INVENTION

1. Field of the Invention

The present invention relates to systems and methods for controlling a starting and the subsequent vehicle acceleration procedure of a motor vehicle.

2. Description of the Background Art

JP-A 08-207605 discloses a motor vehicle operable in 4WD mode or in 2WD mode. The vehicle can start in 4WD mode. A transfer has a torque distribution clutch. Regulating hydraulic fluid pressure applied to the clutch in response to a control signal can alter amount of torque branched off output torque of an engine. A controller generates the control signal. The controller uses, as inputs, accelerator pedal opening and wheel speeds. The controller calculates acceleration slip based on the wheel speeds. The controller calculates a first value of torque based on the accelerator pedal opening and a second value of torque based on the acceleration slip. The controller establishes a threshold vehicle speed (20 km/h, for example) and compares vehicle speed to the threshold vehicle speed. The controller sets a greater one of the first and second values as a base torque when the vehicle speed is lower than the threshold vehicle speed. The controller sets the second value as the base torque when the vehicle speed is equal to or higher than the threshold vehicle speed. The controller takes vehicle deceleration into account in determining the control signal based on the base torque to allow rapid drop in torque transmitting capacity of the clutch, thereby to quickly disable 4WD. This measure is effective in avoiding occurrence of tight corner braking.

In a starting and the subsequent vehicle acceleration procedure of this known system, since there is always a time delay, disabling a 4WD mode when the vehicle speed reaches the threshold vehicle speed causes acceleration slip to occur until another 4WD mode is enabled. This procedure is disadvantageous in that the acceleration slip during the transition is tamed by a threshold vehicle speed only, so that the threshold vehicle speed could not be lowered below a lower limit even if required by demand for enhanced fuel economy.

SUMMARY OF THE INVENTION

An object of the present invention is to provide system and method for controlling a starting and the subsequent vehicle acceleration procedure of a motor vehicle, whereby the vehicle is driven with excellent fuel economy and optimal vehicle acceleration during a start.

According to one exemplary implementation of the present invention, there is provided a method or system for controlling a starting and the subsequent vehicle acceleration procedure of a motor vehicle, by driving the vehicle in all-wheel mode by applying torque to a road wheel in response to a command, the method or system comprising:

comparing a predetermined variable that grows continuously during the starting and the subsequent vehicle acceleration procedure to a threshold value;

determining a first desired value of torque in response to operator demand;

determining a second desired value torque in response to acceleration slip;

determining the command in response to the first desired value of torque when the predetermined variable is lower than or equal to the threshold value; and determining whether or not driving situation justifies a change from determining the command in response to the first desired value of torque to determining the command in response to the second desired value of torque.

BRIEF DESCRIPTION OF THE DRAWINGS

The invention will be apparent from reading of the following description in conjunction with the accompanying drawings.

DETAILED DESCRIPTION OF THE INVENTION

Figure 1:
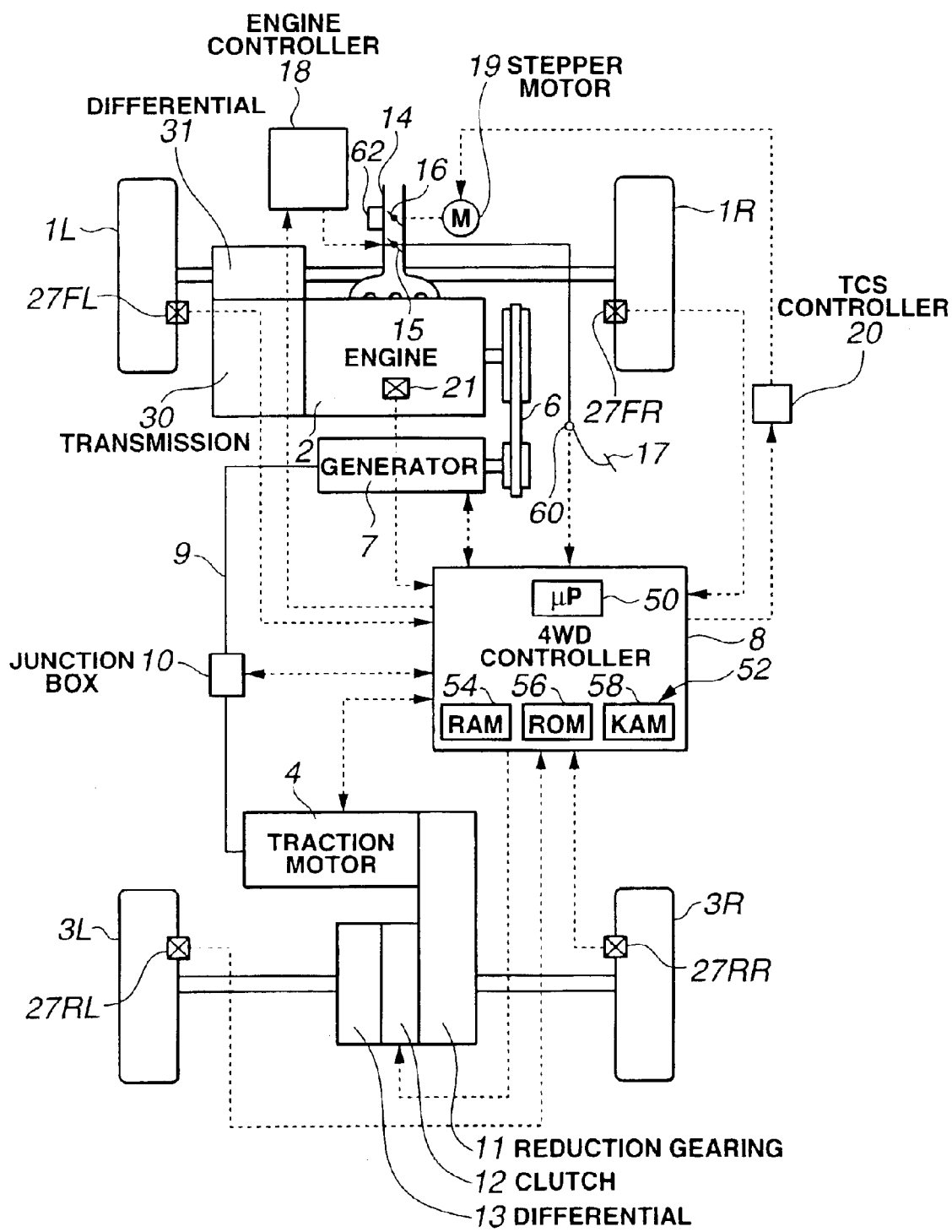
FIG. 1 is a simplified view of a motor vehicle incorporating the present invention.

Referring now to the accompanying drawings, FIG. 1 shows a motor vehicle incorporating a vehicle powertrain control system according to the present invention. The vehicle includes one or first powertrain and another or second powertrain. The first powertrain includes a prime mover in the form of an internal combustion engine 2. The first powertrain is drivingly coupled with a first set of road wheels 1L and 1R. The second powertrain includes an electric traction motor 4 as a source of driving torque, and a clutch 12 as a torque-transmitting device between the electric motor 4 and a second set of road wheels 3L and 3R.

In the illustrated motor vehicle, the engine 2 is a main source of driving torque. The engine 2 has an induction pipe in the form of an intake manifold 14. Within the intake manifold 14, the engine 2 has a main throttle valve 15 and a sub throttle valve 16.

The main throttle valve 15 opens in degrees in response to an acceleration demand in the form of an accelerator pedal opening (APO) of an accelerator 17 in the form of an accelerator pedal in the illustrated motor vehicle. In the illustrated motor vehicle, the APO may be expressed as a proportion (%) of an angle through which the vehicle operator manipulates the accelerator 17 from its released position to the fully manipulated angle. An operative connection between the accelerator 17 and the main throttle valve 15 may be a mechanical linkage as indicated by the fully drawn line or an actuator system. The actuator system includes an accelerator sensor 60, an engine controller 18 and a throttle actuator, not shown. The engine controller 18 monitors the accelerator sensor 60 to receive the APO of the accelerator 17, determines a desired value of opening angle of the main throttle 15, and computes an actuator command. In response to the actuator command, the throttle actuator adjusts the main throttle valve 15 to the desired value.

For actuation of the sub throttle valve 16, a stepper motor 19 and a throttle sensor 62 are provided. A stepper motor controller of a traction control system (TCS) controller 20 receives a control signal indicative of an angle $\Delta\theta$. The manner of determining this angle $\Delta\theta$ is explained later in connection with the flow diagrams in FIGS. 2 and 3. The TCS controller 20 computes the number of steps by which the stepper motor 19 moves. The stepper motor controller 20 receives the output of the throttle sensor 62 to form a closed loop control of the sub throttle valve 16. Using the sub throttle valve 16, an engine output torque Te is altered independently of the position of the main throttle valve 15.

For transmitting the engine torque Te, the first powertrain further includes a transmission 30 and a differential 31. The transmission 30 has various shift ranges. In the illustrated embodiment, the transmission 30 is an automatic transmission including a torque converter. The torque converter includes a pump impeller, a stator and a turbine runner. The pump impeller is coupled with a crankshaft of the engine 2 for rotation therewith. The turbine runner is coupled with an input shaft of the automatic transmission. An output shaft of the automatic transmission is coupled with the differential. The automatic transmission has various speed ratios of the input shaft to the output shaft. The differential 31 is disposed between the first set of road wheels 1L and 1R. In the illustrated embodiment, an automatic transaxle of the RE4F03B type is used, which includes a torque converter, a four-speed automatic transmission and a differential. For further information on the automatic transaxle of the RE4F03B type, reference is made to pages C-6 to C-22 in service manual "Nissan MARCH" issued February 2002 by Nissan Motor Co., Limited.

The second powertrain includes a reduction gearing 11 coupled with the electric traction motor 4, and a differential 13 coupled with the clutch 12. The differential 13 is disposed between the second set of road wheels 3L and 3R. The clutch 12 has an input shaft coupled with an output member of the reduction gearing 11. An output shaft of the clutch 12 is coupled with an input member of the differential 13. In the illustrated embodiment, an integral drive unit including a reduction gearing, an electromagnetic clutch and a differential is used. For further information on this integral drive unit, one may make reference to pages C-6 to C-13 (particularly page C-10) in service manual "Nissan MARCH" issued September 2002 by Nissan Motor Co., Limited.

In the illustrated embodiment, the clutch 12 is an electromagnetic clutch equipped with a cam-actuated pilot clutch. For excitation of coils, the clutch 12 is connected to a source of electricity, not shown. The description on how the cam-actuated pilot clutch operates is found in U.S. Pat. No. 5,464,084 issued Nov. 7, 1995, which has been incorporated herein by reference in its entirety.

In the illustrated embodiment, the road wheels of the first set are a front left road wheel 1L and a front right road wheel 1R, respectively, and the road wheels of the second set are a rear left road wheel 3L and a rear right road wheel 3R, respectively. The present invention is not limited to this example. The road wheels of the first set may be a rear left road wheel and a rear right road wheel, respectively, and the road wheels of the second set may be a front left road wheel and a front right road wheel. As the discussion proceeds, it will be understood that the vehicle is ready for operation in 4WD mode when, after engagement of clutch 12, powertrain play is eliminated for motor torque transmission to motor driven or the second set of road wheels 3L and 3R.

With regard to the second powertrain, the electric motor 4 operates on electric power. A source of electric power may be a battery. However, in the illustrated implementation of the present invention, the source is a generator 7 drivingly connected to the engine 2. An endless belt 6 and pulleys drivingly interconnect the generator 7 and the engine 2, causing the generator 7 to rotate at a revolution speed Nh that is expressed as the product of the engine speed Ne and a pulley ratio $R_p$. The pulley ratio $R_p$ is a ratio between the pulleys, one on the engine output shaft, and the other on the generator shaft.

The generator 7 becomes a load to the engine 2 when it is supplied with generator field current Ifh and produce electric power in response to an engine torque that overcomes this load. This engine torque is hereinafter called "load torque Th." A cable 9 interconnects the generator 7 and the electric motor 4. A junction box 10 is positioned in the cable 9 between the generator 7 and the electric motor 4. Within the junction box 10, a relay 24 is provided to selectively supply the electric power to the electric motor 4.

With continuing reference to FIG. 1, wheel speed sensors 27FL, 27FR, 27RL and 27RR detect wheel revolutions of the associated road wheels, respectively. An engine revolution sensor 21 detects a parameter indicative of revolution of the engine 2.

Figure 4:
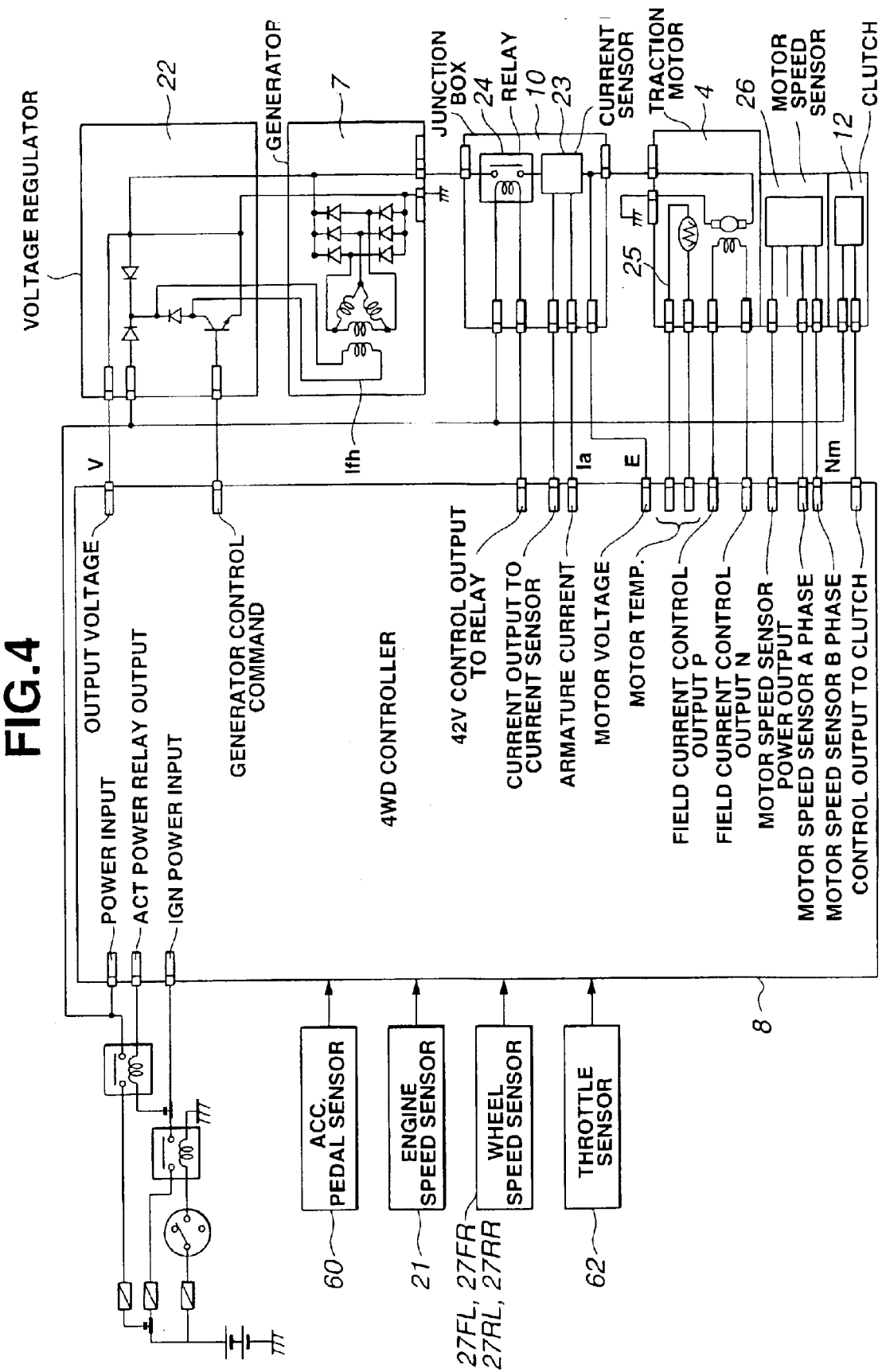
FIG. 4 is a hardware drawing showing the relationship between an all-wheel drive or 4WD controller, an engine controller, and the associated devices.

With reference also to FIG. 4, a current sensor 23 within the junction box 10 measures current of electric power supplied to the electric motor 4 by the generator 7. The measured current is a measure of armature current Ia of the electric motor 4. A motor speed sensor 26 detects revolution Nm of a drive shaft of the electric motor 4. A thermistor 25 is provided to detect temperature of the electric motor 4.

The output signals of the shift detector 32, the sensors 35, 62, 27FL, 27FR, 27RL, 27RR, 21, 60, and 26, and the thermistor 25 are used as inputs to a 4WD controller 8. The 4WD controller 8 includes a microprocessor 50 in communication with computer-readable storage medium 52. As will be appreciated by those skilled in the art, the computer-readable storage medium 52, for example, may include a random access memory (RAM) 54, a read-only memory (ROM) 56, and/or a keep-alive memory (KAM) 58.

With reference to FIG. 4, the 4WD controller processes the inputs and generates a generator command c1 (duty ratio). The generator command c1 is used as input of a voltage regulator 22 for the generator 7. The voltage regulator 22 adjusts generator field current Ifh to a value indicated by the generator command c1. The voltage regulator 22 detects generator output voltage V. The detected generator output voltage V is fed to the 4WD controller 8. Under the control of the 4WD controller 8, the voltage regulator 22 adjusts generator field current Ifh. Adjusting the field current Ifh adjusts load torque Th and generator output voltage V. Thus, the 4WD controller 8 can control load torque Th and generator output voltage V.

The 4WD controller 8 generates a relay command for the relay 24. In response to the relay command, the relay 24 controls application voltage (or current) to the electric motor 4.

The 4WD controller 8 generates motor command for the electric motor 4, thus adjusting motor field current Ifm. Adjusting the motor field current Ifm can adjust motor torque Tm.

The 4WD controller 8 generates clutch command for the clutch 12. In response to the clutch command, the clutch 12 is engaged or disengaged.

Figure 5:
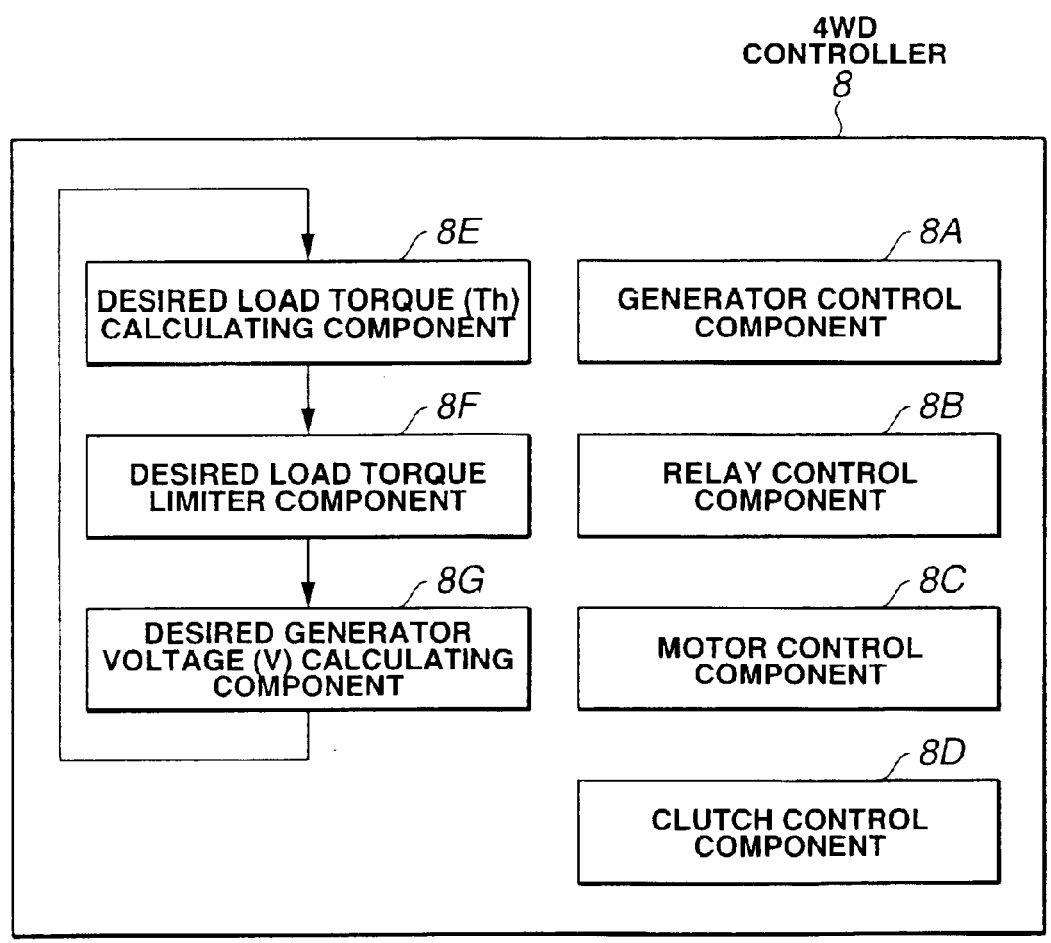
FIG. 5 is a block diagram of the 4WD controller.

The block diagram in FIG. 5 illustrates software or hardware components of the 4WD controller 8.

In one exemplary implementation according to the present invention, a generator control component 8A receives a desired value of generator voltage V. The desired value of generator voltage V is calculated at a desired generator voltage (V) calculating component 8G. The generator control component 8A determines generator command c1 in the form of duty ratio (%). This generator command c1 is applied to the voltage regulator 22. In response to the generator command c1, the voltage regulator 22 adjusts generator field current Ifh, causing the generator 7 to output voltage V as high as the desired value.

A relay control component 8B generates relay command. The relay command is applied to the relay 24 within the junction box 10.

A motor control component 8C inputs information on motor revolution speed Nm, on motor (induction) voltage E, and on motor armature current (motor current) Ia. Motor armature current Ia is determined as a function of motor torque Tm and motor field current Ifm. Thus, motor armature current Ia determines motor torque Tm if motor field current Ifm is unaltered. The motor control component 8C adjusts motor field current Ifm.

A clutch control component 8D receives clutch engagement/release command from the powertrain play adjustor component 8H. In response to the clutch command, the state of the clutch 12 is controlled by controlling supply of current passing through the coils of the clutch 12.

A desired load torque (Th) calculating component 8E determines a desired value of load torque Th.

A desired load torque limiter component 8F compares the desired value of load torque Th to the maximum load capacity HQ of the generator 7. When the desired value of load torque Th exceeds the maximum load capacity HQ, the desired load torque limiter component 8F calculates a surplus torque $\Delta Tb$ ($\Delta Tb = Th - HQ$) and sets the maximum load capacity HQ as Th. The desired load torque limiter component 8F calculates an engine torque upper limit TeM (TeM= Te$-\Delta Tb$, where Te is a current value of engine torque) and outputs the engine torque upper limit TeM to the engine controller 18.

Figure 2:
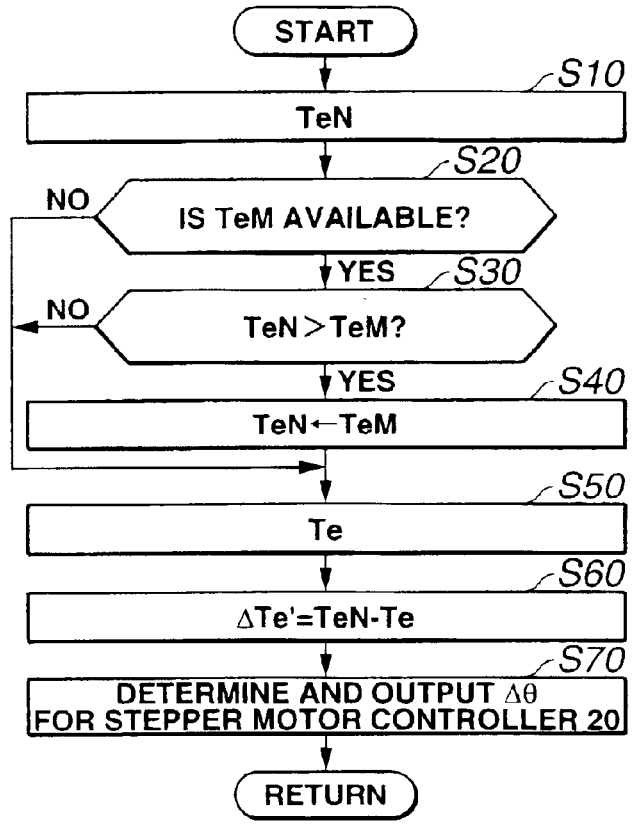
FIG. 2 is a flow diagram illustrating operation of an engine controller.

With reference now to FIG. 2, the flow diagram in FIG. 2 illustrates operation of the engine controller 18.

In box S10, the engine controller 18 determines a desired value of engine torque TeN based on the output signal (APO) of the accelerator pedal sensor 60.

Figure 7:
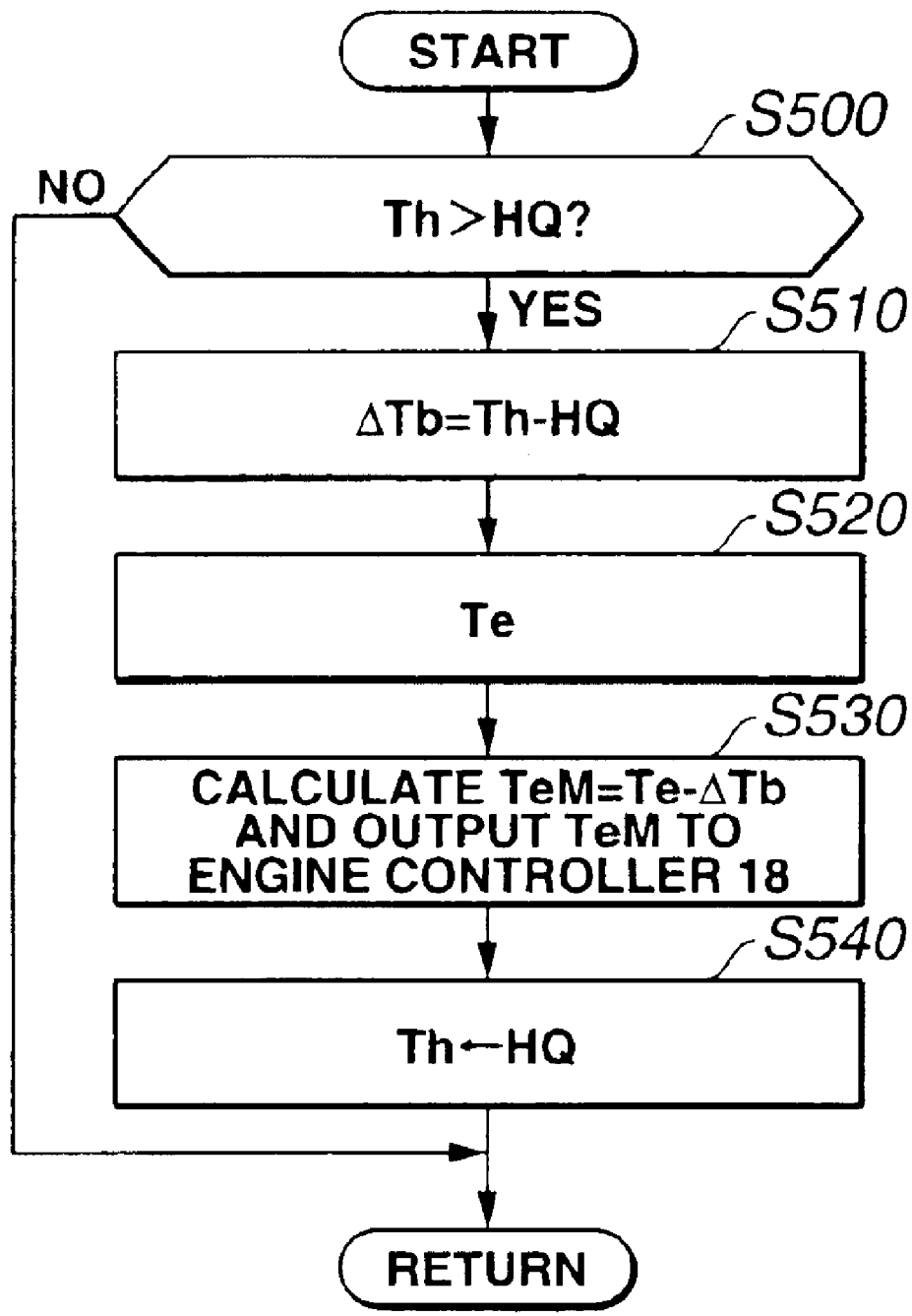
FIG. 7 is a flow diagram illustrating a control routine for software implementation of a desired load torque limiter component.

In the next box S20, the engine controller 18 determines whether or not the engine torque upper limit TeM, which will be determined in box S530 in FIG. 7, is fed thereto from the 4WD controller 8. If this is the case, the control logic goes to box S30. If this is not the case, the control logic goes to box S50.

In box S30, the engine controller 18 determines whether or not the desired value of engine torque TeN is greater than the engine torque upper limit TeM. If this is the case, the control logic goes to box S40. If this is not the case, the control logic goes to box S50.

In box S40, the engine controller 18 sets the engine torque upper limit TeM as the desired value of engine torque TeN.

In the next box S50, the engine controller 18 determines a current value of engine torque Te based on accelerator pedal opening APO and engine speed Ne, which are provided by the output signals of the accelerator pedal sensor 60 and engine revolution sensor 21. In determining the current value of engine torque Te, the engine controller 18 may use a look-up map as illustrated in FIG. 15 of U.S. Pat. No. 6,434,469 B1 issued Aug. 13, 2002, which has been incorporated herein by reference in its entirety.

In the next box S60, the engine controller 18 computes a deviation $\Delta Te'$ that is expressed as:

$$\Delta Te' = TeN - Te \quad (1)$$

In the next box S70, the engine controller 18 determines a change $\Delta\theta$ in throttle opening angle $\theta$ for the deviation $\Delta Te'$ and outputs the determined change $\Delta\theta$ to the TCS controller 20, causing the sub throttle valve 16 to move accordingly.

Figure 3:
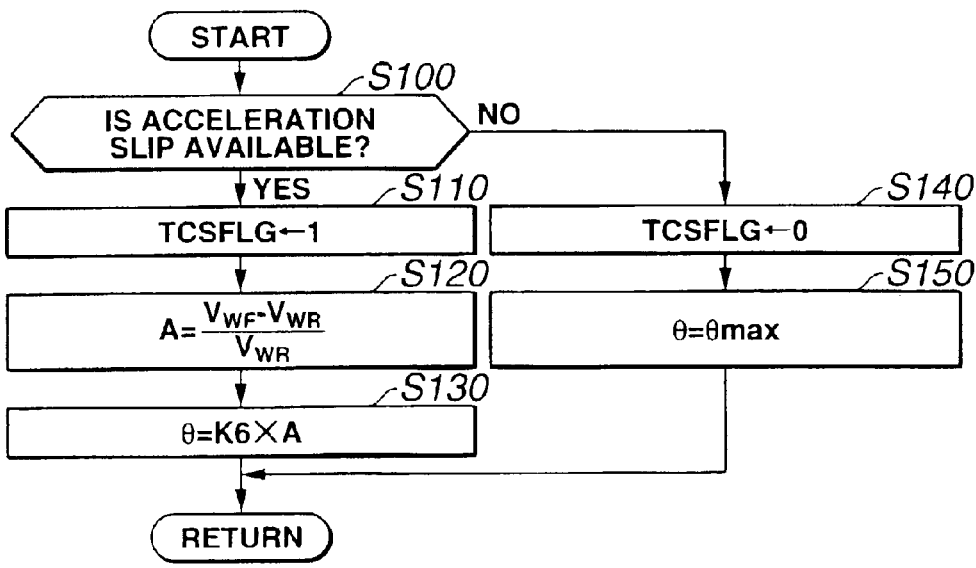
FIG. 3 is a flow diagram illustrating operation of a traction control system (TCS) controller.

With reference to FIG. 3, the TCS controller 20 performs a function to suppress acceleration slip, which occurs at drive wheels, i.e., the front road wheels 1L, 1R in the embodiment. Upon detecting occurrence of such acceleration slip, the TCS controller 20 closes the sub throttle valve 16 to reduce engine output independently of the manipulation of the main throttle valve 15 by the vehicle operator. A TCS flag TSCFLG is provided, which is set when the TCS controller 20 is performing the above-mentioned engine torque reduction control to suppress acceleration slip.

The flow diagram in FIG. 3 illustrates operation of the TCS controller 20 in performing the above-mentioned engine torque reduction control to suppress acceleration slip, namely, TCS control.

In box S100, it is determined whether or not acceleration slip occurs. If this is the case, the control logic goes to box S110. If this is not the case, the control logic goes to box S140.

In box S110, the TCSFLG is set, while in box S140, the TCSFLG is cleared. After clearing the TCSFLG, a desired value $\theta$ of opening angle of sub throttle 16 is set equal to an opening angle $\theta_{max}$ that is greater than any current values of opening angle, which the main throttle valve 15 may take. Then, the TCS controller 20 adjusts the sub throttle valve 16 to the opening angle $\theta_{max}$. With the sub throttle valve 16 opened to the opening angle $\theta_{max}$, the main throttle valve 15 takes over the control of engine output torque.

After setting the TCSFLG in box S110, the control logic goes to box S120. In box S120, a so-called slip rate A is determined. The slip rate A is expressed as, $$A = \frac{V_{WF} - V_{WR}}{V_{WR}} \quad (2)$$

where:
V$_{WF}$ is the average speed of front road wheels;
V$_{WR}$ is the average speed of rear road wheels.

In the next box S130, the desired value θ of opening angle of the sub throttle valve 16 is determined by calculating the following equation.

$$\theta = K6 \times A \quad (3)$$

where:
K6 is the gain.

The gain K6 may have various values taking into account a deviation between a present and the preceding values of slip rate A.

In the embodiment, the motor vehicle is equipped with a traction control system (TCS). The TCS includes the TCS controller 20. The TCS estimates or detects a road surface coefficient of friction to determine whether or not traction control is to be carried out. The TCS carries out traction control when the road surface coefficient of friction is low and sets an in-operation flag TCSFLG. The flag TCSFLG is set (TCSFLG=1) indicative of in-operation of the traction control when the road surface coefficient of traction is low. The flag TCSFLG is cleared or reset (TCSFLG=0) when the road surface coefficient of traction is not low. In the embodiment, this flag TCSFLG is used as an indicator that the road surface coefficient of friction (μ) is low.

Figure 6:
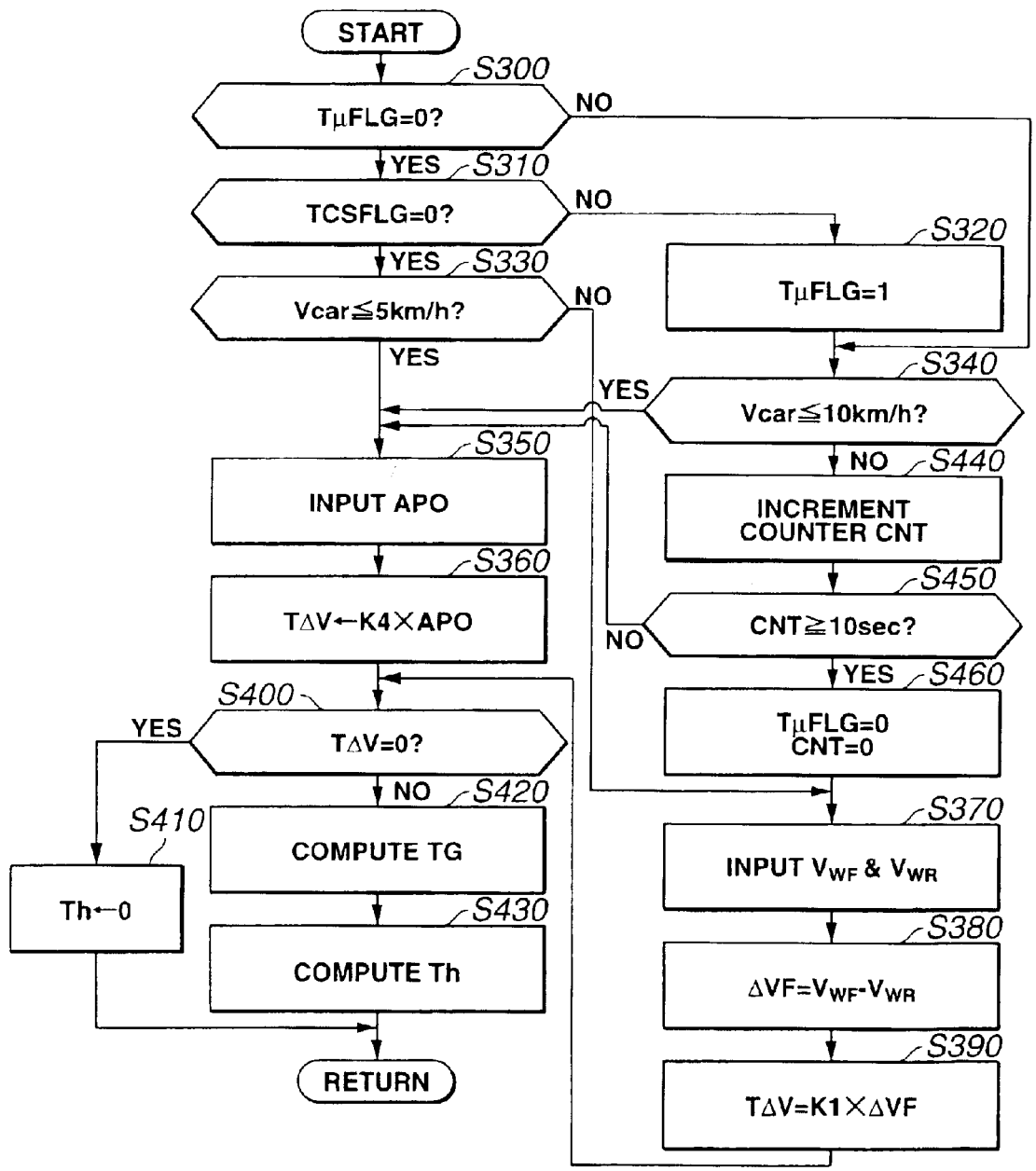
FIG. 6 is a flow diagram illustrating operation of one embodiment of a system or method for controlling a starting and the subsequent vehicle acceleration procedure of the motor vehicle according to the present invention.

The flow diagram in FIG. 6 illustrates operation of one embodiment of a system for controlling a starting procedure of the motor vehicle according to the present invention. The present invention is implemented in a control routine for software implementation of the desired load torque (Th) calculating component 8E.

With reference to FIG. 6, the desired load torque Th is calculated in boxes S400, S410, S420 and S430. For calculating the desired load torque Th, a desired value TΔV of torque to be generated by the motor 4 for application to rear road wheels 3L and 3R is determined in box S360 or box S390. There are two processes for determining the desired value TΔV of torque for application to the rear road wheels 3L and 3R. For ease of explanation, the two processes are referred to as a first or torque-based process and a second or slip-based process. Boxes S350 and S360 illustrate the first process. Boxes S370, S380 and S390 illustrate the second process.

According to the first or torque-based process, the desired value TΔV of torque for application to the rear road wheels 3L and 3R is determined based on output torque of the engine 15 for application to the front road wheels 1L and 1R. The output torque of the engine 15 is determined in response to an accelerator pedal opening (APO) angle of the accelerator 17. The APO indicates operator demand expressed via the accelerator 17. Thus, in the first process, the operator demand determines the desired value TΔV.

According to the second or slip-based process, an acceleration slip ΔVF occurring at the front road wheels 1L and 1R determines the desired value TΔV of torque for application to the rear road wheels 3L and 3R.

In FIG. 6, boxes S300, S310, S320, S330, S340, S440, S450 and S460 illustrate a logic unit to determine which one of the first and second processes is to be executed.

According to the logic unit illustrated in FIG. 6, a threshold vehicle velocity or speed α is established. A vehicle velocity or speed V$_{car}$ of the motor vehicle is monitored. The vehicle speed V$_{car}$ is compared to the threshold vehicle speed α (see S330 or S340). The first process is executed when the vehicle speed V$_{car}$ is lower than or equal to the threshold vehicle speed α. The second process is executed when the vehicle speed V$_{car}$ exceeds or becomes higher than the threshold vehicle speed α. In the embodiment, a road surface coefficient of friction μ determines the threshold vehicle speed α such that lowering the road surface coefficient of friction μ elevates the threshold vehicle speed α. Available information on a change in road surface coefficient of friction may be continuous or discrete. If it is continuous, the threshold vehicle speed α may be elevated continuously. If it is discrete and has two levels, the threshold vehicle speed α may be elevated from a lower vehicle speed to a higher vehicle speed. In the illustrated flow diagram of FIG. 6, a drop in road surface coefficient of friction μ elevates the threshold value speed α from a lower vehicle speed of 5 km/h (see box S330) to a higher vehicle speed of 10 km/h (see box S340).

With continuing reference to FIG. 6, execution of the flow diagram is repeated at regular intervals. In box S300, the 4WD controller 8 determines whether or not a so-called low μ flag TμFLG is cleared. If, in box S300, the low μ flag TμFLG is cleared or reset (TμFLG=0), the logic goes to box S310. If, in box S300, the low μ flag TμFLG is set (TμFLG=1), the logic goes to box S340.

As the discussion proceeds, it will be noted that the low μ flag TμFLG switches from zero (0) level to one (1) level once the logic goes from box S300 to box S310 and then to box S320 upon determination that a road surface coefficient of friction μ is low. The low μ flag TμFLG continues to stay at one (1) level until a predetermined condition will be met. The fact that the predetermined condition is met justifies execution of the slip-based process to determine the desired value TΔV of torque based on acceleration slip ΔVF. In the embodiment, when the predetermined condition is met in a starting procedure of the motor vehicle, the logic goes from box S340 via boxes S440 and S450 to S460. In box S460, the low μ flag TμFLG is cleared. After box S460, the logic goes through boxes S370, S380 and S390 where the slip-based process is executed.

In FIG. 6, in box S310, the 4WD controller 8 determines whether or not the flag TCSFLG is cleared (TCSFLG=0). If this is the case, the logic goes to box S330. If this is not the case, the logic goes to box S320.

In box S330, the 4WD controller 8 determines whether or not the vehicle speed V$_{car}$ is lower than or equal to 5 km/h, which is now set as the threshold vehicle speed α. If this is the case, the logic goes to box S350 to carry out the torque based process. If this is not the case, the logic goes to box S370 to carry out the slip-based process.

As mentioned before, the torque-based process is carried out in boxes S350 and S360. In box S350, the 4WD controller 8 inputs information on APO from the accelerator sensor 60. In the next box S360, the 4WD controller 8 determines a desired value TΔV of torque, which is expressed as:

$$T\Delta V = k4 \times APO \quad (4)$$

where:
K4 is the gain determined, for example, by simulation.

As discussed before, the APO is indicative of drive torque applied to the front road wheels 1L and 1R. Since it is determined as a function of APO, the desired value TΔV of torque expressed by the equation (4) is dependent upon the drive torque applied to the front road wheels 1L and 1R. Thus, it may be referred to as a torque based desired value TΔV.

As mentioned before, the slip-based process is carried out in boxes S370, S380 and S390. In box S370, the 4WD controller 8 inputs information on wheel speeds $V_{WFL}$, $V_{WFR}$, $V_{WRL}$, and $V_{WRR}$ from the wheel speed sensors 27FL, 27FR, 27RL and 27RR to determine the average speed of front road wheels $V_{WF}$ and the average speed of rear road wheels $V_{WR}$, which are expressed as:

$$V_{WF} = \frac{V_{WFL} + V_{WFR}}{2} \quad (5)$$

$$V_{WR} = \frac{V_{WRL} + V_{WRR}}{2}$$

In the next box S380, the 4WD controller 8 determines an acceleration slip or slip speed $\Delta VF$, which is an amount of acceleration slip of the front road wheels 1L and 1R. The acceleration slip $\Delta VF$ is expressed as:

$$\Delta VF = V_{WF} - V_{WR} \quad (6)$$

In the next box S390, the 4WD controller 8 determines a desired value $T\Delta V$ of torque, which is expressed as:

$$T\Delta V = K1 \times \Delta VF \quad (7)$$

where:

K1 is the gain determined, for example, by simulation.

As it is determined as a function of the acceleration slip $\Delta VF$, the desired value $T\Delta V$ of torque expressed by the equation (7) is dependent upon the acceleration slip occurring at the front road wheels 1L and 1R. Thus, it may be referred to as a slip based desired value $T\Delta V$. The slip based desired value $T\Delta V$ of torque is indicative of an engine torque that is to be absorbed to suppress the acceleration slip $\Delta F$.

After determining the desired value $T\Delta V$ of torque in box S360 or S390, the logic goes to box S400. As mentioned before, the desired load torque Th is calculated in boxes S400, S410, S420 and S430.

In box S400, the 4WD controller 8 determines whether or not the desired value $T\Delta V$ of torque is equal to a predetermined value of 0 (zero). If this is the case ($T\Delta V=0$), the logic goes to box S410. If this is not the case ($T\Delta V>0$), the logic goes to box S420.

In box S410, the 4WD controller 8 sets 0 (zero) as a desired value of load torque Th (Th←0) before returning to a start point.

In box S420, the 4WD controller 8 computes a current value of load torque TG. The current value of load torque TG is expressed as:

$$TG = k2 \times \frac{V \times Ia}{k3 \times Nh} \quad (8)$$

where: V is the voltage of generator 7;
Ia is the armature current of generator 7;
Nh is the revolution speed of generator 7;
K3 is efficiency; and
K2 is coefficient.

In the next box S430, the 4WD controller 8 computes a desired value of load torque Th before returning to the start point. The desired value of load torque Th is expressed as:

$$Th = TG + T\Delta V \quad (9)$$

Referring back to boxes S300, S310 and S330, it will be noted that the logic always comes down to box S330 under condition where a road surface coefficient of friction $\mu$ is not low. More specifically, the road surface coefficient of friction $\mu$ is not lower than a threshold coefficient of friction, keeping each of the low $\mu$ flag T$\mu$FLG and the flag TCSFLG equal to 0 (zero). Under this condition, the first or torque-based process in boxes S350 and S360 is executed when the vehicle speed $V_{car}$ is lower than or equal to 5 km/h, and the second or slip-based process in boxes S370, S380 and S390 is executed when the vehicle speed $V_{car}$ exceeds 5 km/h. Thus, under this condition, the threshold vehicle speed $\alpha$ continues to be 5 km/h.

Subsequently after the road surface coefficient of friction $\alpha$ has become lower than the threshold coefficient of friction to set the flag TCSFLG, the logic goes from box S310 to box S320. In box S320, the 4WD controller 8 sets the low $\mu$ flag T$\mu$FLG. Immediately after the low $\mu$ flag T$\mu$FLG has been set, the 4WD controller 8 elevates the threshold vehicle speed $\alpha$ from the lower vehicle speed of 5 km/h to a higher vehicle speed of 10 km/h. In plain words, the threshold vehicle speed $\alpha$ is elevated to the higher vehicle speed of 10 km/h when the road surface coefficient of friction $\mu$ is low.

In the subsequent cycles after the low $\mu$ flag T$\mu$FLG has been set, the logic goes directly to box S340 from box S300.

In box S340, the 4WD controller 8 determines whether or not the vehicle speed $V_{car}$ is lower than or equal to 10 km/h, which is now set as the threshold vehicle speed $\alpha$. If this is the case, the logic goes to box S350 to continuously carry out the torque based process. If this is not the case, the logic goes to box S440.

In box S440, the 4WD controller 8 increments or counts up a counter CNT.

In the next box S450, the 4WD controller 8 determines whether or not the content of the counter CNT has reached or exceeded a predetermined number of count that is yielded after dividing a predetermined time of 10 seconds by the time elapsed between the start of the flow diagram in FIG. 6 to the next start of the same flow diagram. If this is not the case, the logic goes from box S450 to box S350 to continuously carry out the torque-based process. If this is the case, the logic goes to box S460.

In box S460, the 4WD controller 8 resets each of the low $\mu$ flag T$\mu$FLG and counter CNT to 0 (zero). The logic goes from box S460 to box S370 to carry out the slip-based process.

The provision of boxes S440 and S450 and the counter resetting (CNT=0) in box S460 is to eliminate hunting that may occur when the vehicle speed $V_{car}$ exceeds 10 km/h temporarily.

In the illustrated flow diagram of FIG. 6, let us now consider how the flow diagram may be altered to cope with the case where it is required to eliminate hunting that may occur when the vehicle speed $V_{car}$ exceeds 5 km/h temporarily. In this case, a "NO" arm of the box S330 is separated from the box S370. The "NO" arm of the box S330 is connected to the box corresponding to the box S440. The box corresponding to the box S440 is followed by the box, which corresponds to the box S450. The box corresponding to the box S450 has its "NO" arm connected to the box S350. A "YES" arm of the box, which corresponds to the box S450, is connected to a box where the content of the counter CNT is cleared. The box S370 follows this box where the counter CNT is cleared.

If hunting poses little problem or there actually takes place no such hunting, the logic goes directly to the box S450 from the box S340 after removing the boxes S440 and S450.

The preceding description on the boxes S440 and S450 clearly supports a feature that the dynamic situation justifies continuous execution of the first or torque-based process unless the vehicle speed $V_{car}$ continuously exceeds the threshold vehicle speed α (5 km/h or 10 km/h) for the predetermined time of 10 seconds, for example.

The operation illustrated by the flow diagram 6 will be later discussed in connection with FIGS. 9A to 9E. Prior to the discussion, reference is made to FIG. 7 and then to FIG. 8 to illustrate the desired load torque limiter component 8F (see FIG. 5) and the desired generator voltage (V) calculating component 8G (see FIG. 5).

The flow diagram in FIG. 7 illustrates a control routine for software implementation of the desired load torque limiter component 8F.

In box S500, the 4WD controller 8 determines whether or not the desired value of load torque Th exceeds the maximum load capacity HQ of the generator 7. If this is the case (Th>HQ), the logic goes to box S510. If this is not the case (Th≦HQ), the logic returns to a start point.

In box S510, the 4WD controller 8 computes a surplus torque ΔTb, which is expressed as:

$$\Delta Tb = Th - HQ \tag{10}$$

In the next box S520, the 4WD controller 8 determines a current value of engine torque Te based on APO and Ne, which are provided by the output signals of the accelerator sensor 60 and engine revolution speed sensor 21. In determining the current value of engine torque Te, the 4WD controller 8 may use the look-up map illustrated in FIG. 15 of the already incorporated U.S. Pat. No. 6,434,469 B1.

In box S530, the 4WD controller 8 computes an engine torque upper limit TeM that is expressed as:

$$TeM = Te - \Delta Tb \tag{11}$$

In the same box S530, the 4WD controller 8 outputs the engine torque upper limit TeM to the engine controller 18 (see box S20 in FIG. 2).

In the next box S540, the 4WD controller 8 sets the maximum load capacity HQ as the desired value of load torque Th to be applied to the engine 2 by the generator 7.

Figure 8:
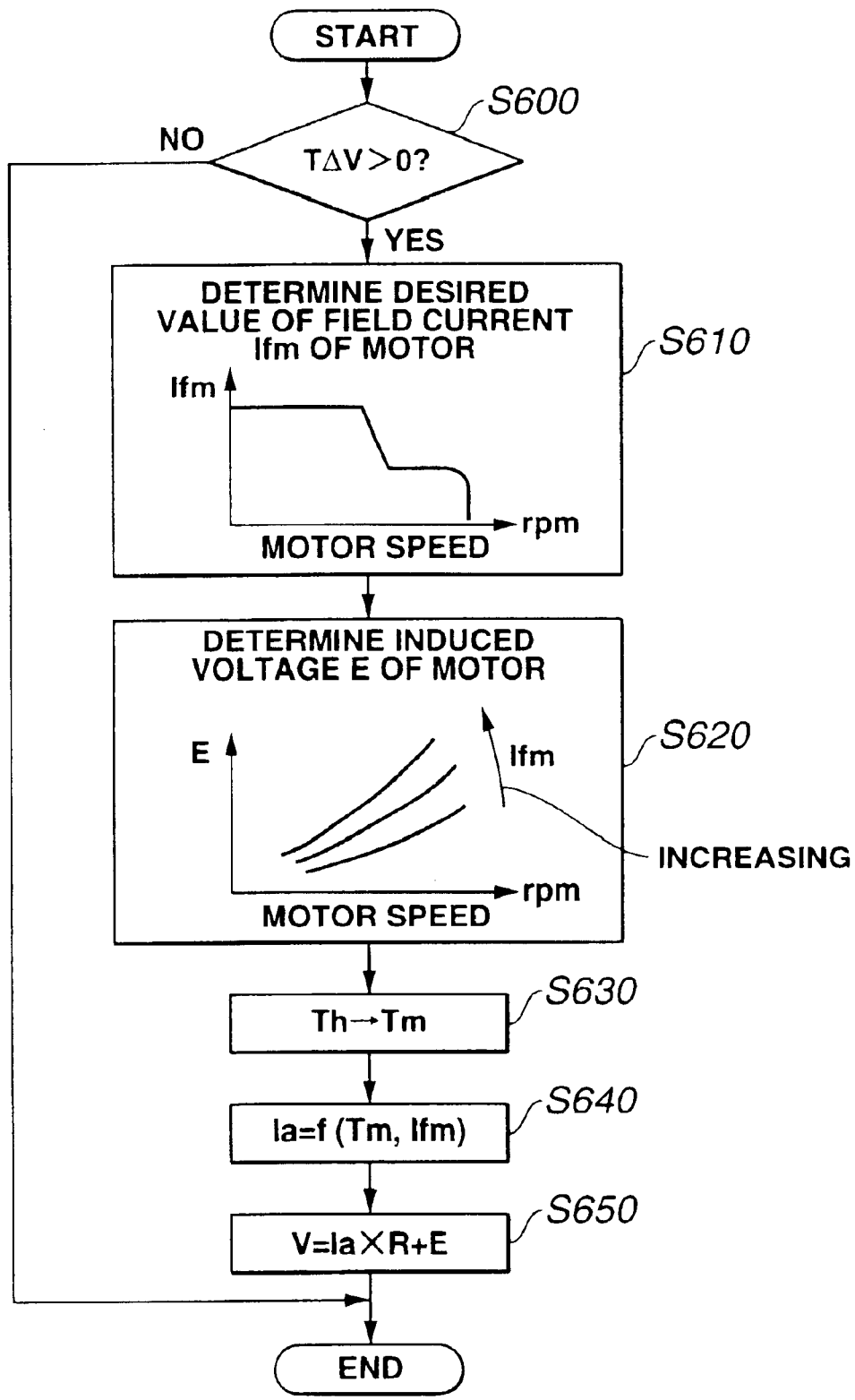
FIG. 8 is a flow diagram illustrating a control routine for software implementation of a desired generator voltage calculating component.

Next, the flow diagram in FIG. 8 illustrates a control routine for software implementation of the desired generator voltage (V) calculating component 8G.

In box S600, the 4WD controller 8 determines whether or not the desired value TΔV of torque, which has been determined in box S360 or S390 in FIG. 6, is greater than 0 (zero). If this is the case (TΔV>0), the logic goes to box S610. If this is not the case (TΔV=0), the logic returns to a start point.

In box S610, the 4WD controller 8 inputs information of motor speed Nm from the motor speed sensor 26. The 4WD controller 8 determines a desired value of motor field current Ifm against the motor speed Nm from, for example, a look-up table. The 4WD controller 8 sends the determined desired value of motor field current Ifm to the motor control component 8C (see FIG. 5).

With regard to varying of desired value of motor field current Ifm with different values of the motor speed Nm, the motor field current Ifm is kept constant over a range of revolution speeds lower than a predetermined value, but it is lowered at high revolution speeds equal to or exceeding the predetermined value as shown in box S610.

Unless the motor field current Ifm is lowered at such high revolution speeds, the motor induced voltage E is elevated, making it difficult to secure flow of motor armature current Ia needed to generate sufficiently high motor torque required at such high revolution speeds. Thus, at high revolution speeds equal to or exceeding the predetermined value, the elevation of the induced voltage E is prevented by lowering the motor field current Ifm, securing flow of motor armature current Ia for generation of sufficiently high motor torque Tm.

The map illustrated within the box S610 indicates that the motor field current Ifm be lowered from a high level to a low level in discrete manner. If need arises to provide smoother motor torque characteristic than that provided by the two level variation in the motor field current Ifm, the motor field current Ifm may be continuously varied with different values of motor speed Nm. Continuously varying the motor field current Ifm results in continuous correction of the motor torque Tm over different values of motor speed Nm to produce a desired value of motor torque Tm.

In the next box S620, the 4WD controller 8 determines motor induced voltage E against the desired value of motor field current Ifm and the motor speed Nm from, for example, a look-up map.

In box S630, the 4WD controller 8 computes a desired value of motor torque Tm using the desired value of load torque Th that has been determined at the control routine in FIG. 7. Motor torque Tm is expressed as, $$Tm = \frac{Th \times Ne \times \eta_{ge} \times \eta_{mot}}{Nm} \tag{12}$$

where: Tm is the motor torque;
Nm is the motor speed;
Th is the load torque;
Ne is the engine speed;
$\eta_{ge}$ is the efficiency of generator; and
$\eta_{mot}$ is the efficiency of motor.

In the next box S640, the 4WD controller 8 determines a desired value of motor armature current Ia as a function of the desired value of motor torque Tm and the desired value of motor field current Ifm.

In the next box S650, the 4WD controller 8 computes a desired value of generator voltage V, which is expressed as:

$$V = Ia \times R + E \tag{13}$$

where:
R is the sum of resistance of cable 9 and that of coil of electric motor 4.

According to the flow diagram in FIG. 8, the desired value of generator voltage V is determined in box S250 after due consideration of the electric motor 4. The manner of determining the desired value of generator voltage is not limited to this illustrated example. If the case permits, a desired value of generator voltage V may be directly determined as a function of the desired value of load torque Th.

The present invention is disclosed in combination with the motor vehicle including the electric motor 4 as a source of drive torque applied to the rear road wheels 3L and 3R. The present invention is operable with motor vehicles having other types of 4WD drive system. One example is a 4WD drive system including a transfer case.

The previously described embodiment of the present invention can be understood with reference to the description below.

In order to move the motor vehicle from standstill, a substantially large amount of drive torque needs to be applied to the front road wheels 1L and 1R. Operator steps on the accelerator pedal 17 to cause the engine 2 to generate torque large enough to apply such large amount of drive torque to them. As drive torque applied to the front road wheels 1L and 1R is substantially large, the front road wheels 1L and 1R tend to slip. A need remains to effectively suppress this tendency to slip below a sufficiently low level. This need is met, according to the embodiment, by 4WD based on torque TΔV derived from repeating execution of the first process (see boxes S350 and S360 in FIG. 6) in response to APO. The drive torque proportional to the APO is applied to the rear road wheels 3L and 3R. Using the APO as a control input and the drive torque as a control output, a feed forward 4WD control is provided. This feed forward 4WD control can effectively suppress the tendency of the front wheels 1L and 1R to slip.

To pursue excellent fuel economy as well as good vehicle acceleration after the vehicle start, the operating range of the feed forward 4WD control is confined to the required minimum. Vehicle speed and time are two examples of variables that grow continuously after the vehicle start. Comparing such variable to a threshold value defines what the required minimum means to cover. In the embodiment, the vehicle speed $V_{car}$ is selected as an example of the variables that grow continuously after the vehicle start. The threshold vehicle speed α(=5 km/h) is established. The vehicle speed $V_{car}$ is compared to the threshold vehicle speed α. The feed forward 4WD control is enabled to provide good vehicle acceleration subsequently after the vehicle start when the vehicle speed $V_{car}$ is lower than or equal to the threshold vehicle speed α. It is remembered that execution of the first process (boxes S350 and S360 in FIG. 6) is determined and thus repeated to enable the feed forward 4WD control.

As mentioned before, an acceleration slip inevitably occurs due to a time delay during transition. The embodiment of the present invention finds driving situation to tame this transient acceleration slip. Two major influencing factors on the transient acceleration slip are road surface coefficient of friction μ and drive torque. In the embodiment, a road surface coefficient of friction μ and vehicle speed $V_{car}$ are examined to determine whether or not driving situation justifies a change from the feed-forward 4WD control to a feed-back 2/4WD control. The feed-forward 4WD control applies drive torque to the rear road wheels 3L and 3R in response to the first or torque-based desired value TΔV that is determined in response to operator power demand (APO). The feed-back 2/4WD control applies drive torque to the rear road wheels 3L and 3R in response to the second or slip-based desired value TΔV that is determined in response to acceleration slip.

As mentioned above, the vehicle speed $V_{car}$ is examined as well as the road surface coefficient of friction α. Apparently, the transient acceleration slip depends on the road surface coefficient of friction α. As the vehicle speed $V_{car}$ elevates, a deviation of front wheel speed from the vehicle speed becomes small. Besides, when the vehicle speed $V_{car}$ elevates beyond a shift-up point, the associated transmission shifts up. They cause a drop in drive torque being applied to rear road wheels 3L and 3R. Thus, the vehicle speed $V_{car}$ serves as an indicator indicative of varying of drive torque in the starting and the subsequent vehicle acceleration procedure.

As mentioned before in connection with boxes S300, S310 and S320, the flag TCSFLG is monitored to determine whether or not the road surface coefficient of friction μ is low.

According to the embodiment, as shown in FIG. 6, driving situation justifies a change from the feed-forward 4WD control to the feed-back 2/4WD control when the vehicle speed $V_{car}$ exceeds the threshold vehicle speed α if the road surface coefficient of friction μ remains high. This may be confirmed by following the flow of logic along boxes S300, S310, S330, S370, S380, S390, S400, S420 and S430. In this case, the transitional acceleration slip is suppressed due to high road surface coefficient of friction μ.

According to the embodiment, as shown in FIG. 6, driving situation does not justify the change from the feed-forward 4WD control to the feed-back 2/4WD control when the vehicle speed $V_{car}$ exceeds the threshold vehicle speed α if the road surface coefficient of friction μ is low. This may be confirmed by following the flow of logic along boxes S300, S310, S340, S350, S360, S390, S400, S420 and S430. This flow of logic holds until the vehicle speed $V_{car}$ exceeds another elevated threshold vehicle speed of 10 km/h. Thus, the feed-forward 4WD control remains until the vehicle speed $V_{car}$ exceeds another threshold vehicle speed of 10 km/h if the road surface coefficient of friction μ is low. The vehicle is driven with optimum and stable acceleration in 4WD mode without any occurrence of great acceleration slip.

As the vehicle speed $V_{car}$ increases, a deviation of wheel speed from vehicle speed becomes small and a ratio change in shift-up direction takes place in the transmission, causing a drop in the drive torque being applied to the rear road wheels 3L and 3R. In FIG. 6, driving situation justifies the change from the feed-forward 4WD control to the feed-back 2/4WD control when the vehicle speed $V_{car}$ exceeds the elevated threshold vehicle speed of 10 km/h even if the road surface coefficient of friction μ remains low. This may be confirmed by following the flow of logic along boxes S300, S320, S340, S440, S450, S460, S370, S380, S390, S400, S420 and S430. In this case, the transitional acceleration slip is not large because the drive torque is low.

According to the embodiment, in FIG. 6, the feed-forward 4WD control continues for a predetermined period of time of 10 second, for example, after the vehicle speed $V_{car}$ has exceeded the threshold vehicle speed of 5 km/h if the road surface coefficient of friction μ is high. If the road surface coefficient of friction μ is low, the feed-forward 4WD control continues for the predetermined period of time after the vehicle speed $V_{car}$ has exceeded the elevated threshold vehicle speed of 10 km/h. This may be confirmed by following the flow of logic along boxes S300, S340, S440, S450, S350, S360, S400, S420 and S430.

The feed-back 2/4WD control is carried out after the change has been justified when the vehicle speed $V_{car}$ has exceeded the threshold vehicle speed of 5 km/h if the road surface coefficient of friction μ is high or the elevated threshold vehicle speed of 10 km/h if the road surface coefficient of friction μ is low. With the feed-back 2/4WD control, the 4WD is established only when there is acceleration slip. Thus, fuel economy is enhanced because operating range where the 4WD is established is confined to the required minimum where acceleration slip occurs.

According to the embodiment, the operating range of the feed-forward 4WD control may be confined to the required minimum where acceleration slip during a start should be suppressed by setting a sufficiently low vehicle speed, for example, 5 km/h, as the threshold vehicle speed unless the road surface coefficient of friction μ is low. This provides enhanced fuel economy.

With reference to FIGS. 9A to 9E, the fully drawn lines illustrate operation of the embodiment in a starting and the subsequent vehicle acceleration procedure on a road surface with low μ. For comparison purpose, the broken lines illustrate operation of a system where a change from the feed-forward 4WD control to the feed-back 2/4WD control always occurs.

Figure 9A:
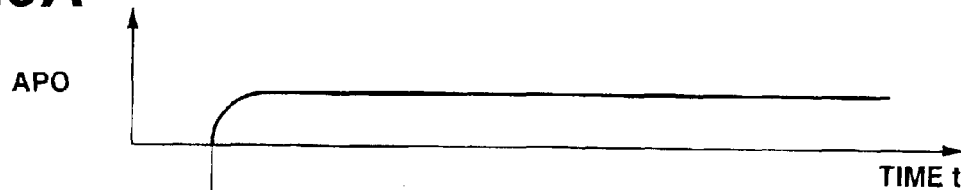
FIGS. 9A to 9E are graphs illustrating operation of the embodiment illustrated in FIG. 6.
Figure 9B:
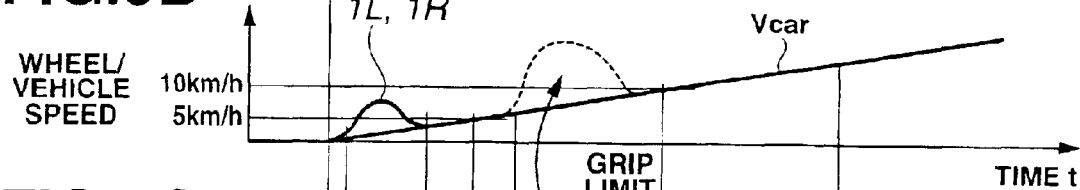
Figure 9C:
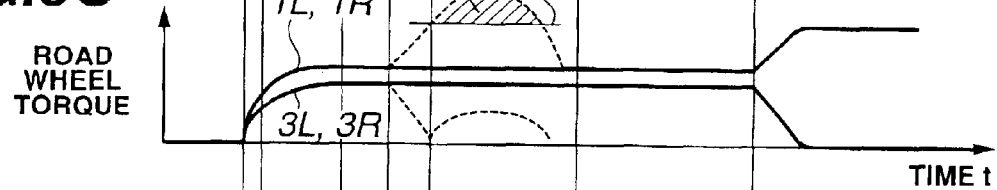

The starting and the subsequent procedure according to the embodiment begins at moment to when operator stepping on the accelerator pedal 17 (see FIG. 9A). At moment $t_1$ immediately after moment $t_0$, an initial acceleration slip begins (see FIG. 9B), setting the flag TCSFLG (see FIG. 9D), thus setting the low $\mu$ flag T$\mu$FLG (see FIG. 9E). Immediately after moment $t_1$, the threshold vehicle speed $\alpha$ changes from 5 km/h to 10 km/h. Subsequently, comparing the vehicle speed $V_{car}$ to the threshold vehicle speed of 10 km/h is repeated.

Figure 9D:
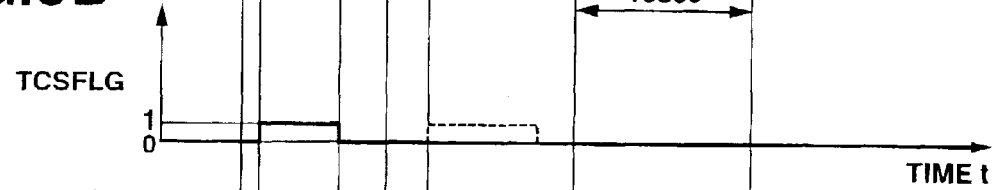

At moment $t_2$ after moment $t_1$, as the feed-forward 4WD control has suppressed the initial acceleration slip (see FIG. 9B), resetting the flag TCSFLG (see FIG. 9D). The low $\mu$ flag T$\mu$FLG remains as it is (see FIG. 9E), thus holding the threshold vehicle speed $\alpha$ at the elevated speed of 10 km/h.

Subsequently at moment $t_5$, the vehicle speed $V_{car}$ exceeds the elevated threshold vehicle speed of 10 km/h. Subsequently, the vehicle speed $V_{car}$ remains above 10 km/h for the predetermined time period of 10 seconds until moment $t_6$. Between $t_5$ and $t_6$, the feed-forward 4WD control continues even after the vehicle speed $V_{car}$ exceeded the elevated threshold vehicle speed of 10 km/h.

Figure 9E:
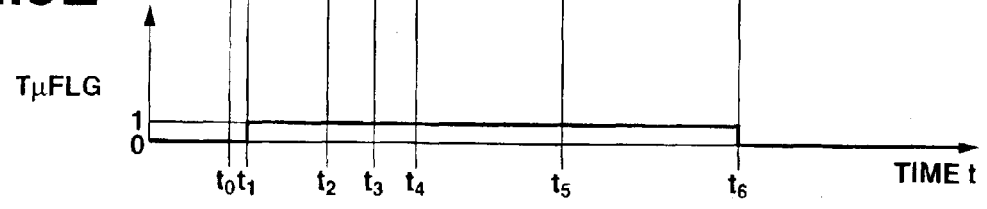

At moment $t_6$, a change to the feed-back 2/4WD control occurs, and low $\mu$ flag T$\mu$FLG is reset (see FIG. 9E). Immediately after moment $t_6$, the feed-back 2/4WD control establishes 2WD if no acceleration slip occurs.

With regard to the operation of the conventional system, at moment $t_3$, the feed-forward 4WD control is disabled when the vehicle speed $V_{car}$ exceeds the threshold vehicle speed of 5 km/h. As a shift from 4WD mode to 2WD mode begins immediately after moment $t_3$, a transition acceleration slip begins at moment $t_4$. In response to this acceleration slip, the feed-back 2/4WD control establishes 4WD. For a period of time after moment $t_4$, the grip of the front road wheels 1L and 1R exceeds a grip limit (see FIG. 9C).

In the embodiment, a single vehicle speed value of 10 km/h is set in response to the road surface coefficient of friction $\mu$ being low. The present invention is not limited to this example. One or more other or intermediate vehicle speed values may be set in response to different levels of the road surface coefficient of friction $\mu$.

In the embodiment, a single event that the road surface coefficient of friction $\mu$ turns into a low level in the procedure until the vehicle speed $V_{car}$ reaches the threshold vehicle speed of 5 km/h provides a cue in setting the elevated threshold vehicle speed of 10 km/h. The present invention is not limited to this example. Another example that may provide the cue is the level of road surface coefficient of friction at vehicle speeds lower than and in the proximity of the threshold vehicle speed of 5 km/h. Another example is the average of estimates or measures of road surface coefficient of friction at all vehicle speeds between a start and moment immediately prior to the threshold vehicle speed of 5 km/h.

In the flow diagram of FIG. 6, the elevated threshold vehicle speed of 10 km/h is set immediately after setting of the flag TCSFLG when the vehicle speed $V_{car}$ is lower than or equal to the threshold vehicle speed of 5 km/h. To remove box S340, the elevated threshold vehicle speed of 10 km/h may be eliminated by separating the "NO" arm of box S300 and by separating the output arm of box S320 from box S340. The separated "NO" and output arms are connected to the input arm of box S330. Box S330 has its "NO" arm connected to the input arm of box S370. A new interrogation box is interposed in the "NO" arm of box S330. In this interrogation box, it is determined whether the low $\mu$ flag T$\mu$FLG is set. If this is the case, the logic goes to box S440. If this is not the case, the logic goes to box S370.

The flow diagram as modified above provides the control strategy that if the road surface coefficient of friction $\mu$ is low when the vehicle speed $V_{car}$ exceeds the threshold vehicle speed of 5 km/h, the feed-forward 4WD control continues for the predetermined time period of 10 seconds. As an increase in the vehicle speed $V_{car}$ from 5 km/h is expected upon elapse of 10 seconds, a change from the feed-forward 4WD control to the feed-back 2/4WD control is expected to occur at an elevated vehicle speed.

In the embodiment, the traction control by adjusting the engine throttle is employed. The present invention is not limited to the TCS of this type and operable with other types of TCS. A representative example is a TCS using a single one or a combination of adjusting of ignition retard, suspending of ignition, reducing or suspending of fuel supply, and adjusting of engine throttle is an example.

Figure 10:
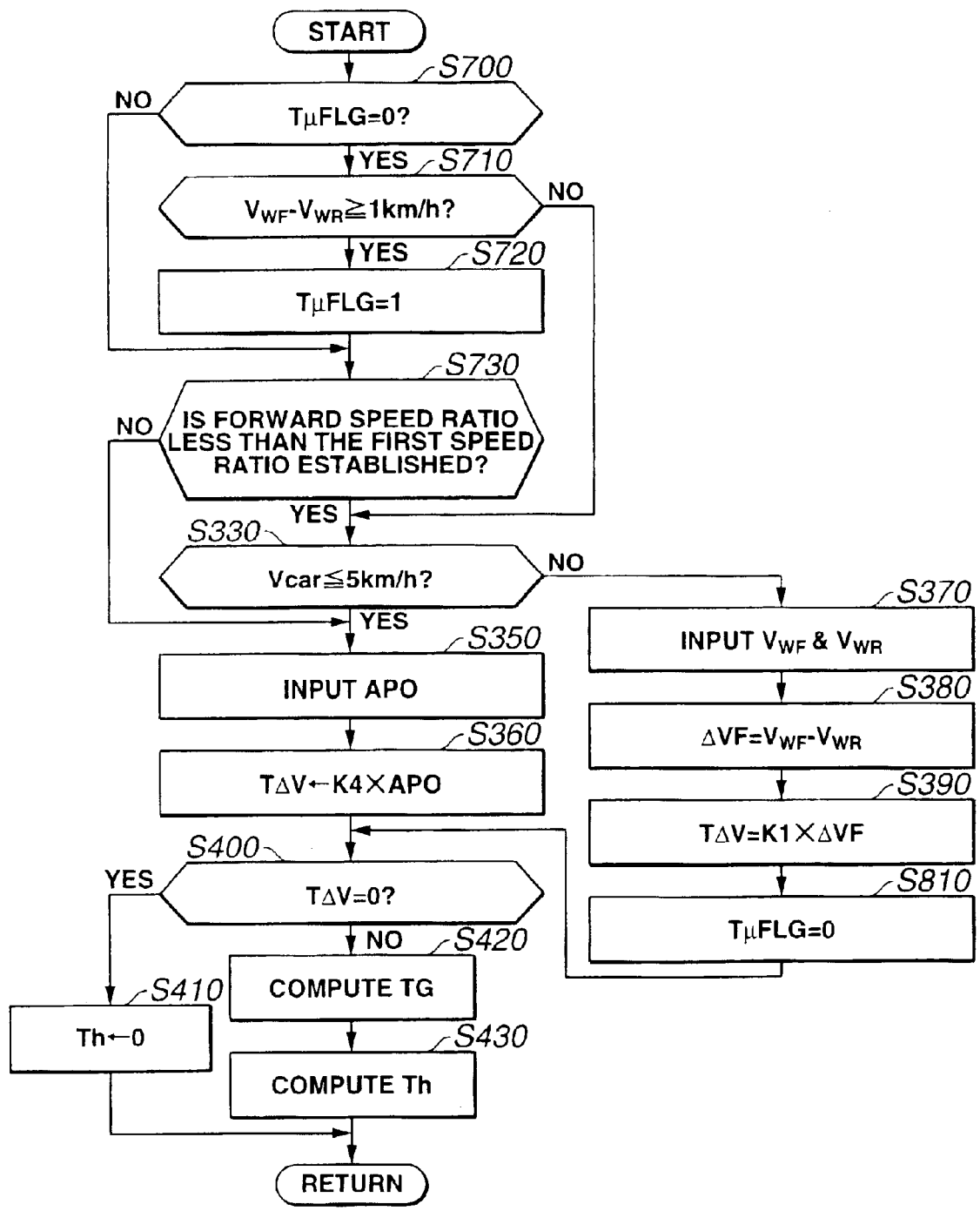
FIG. 10 is a flow diagram illustrating operation of another embodiment of a system or method for controlling a starting and the subsequent vehicle acceleration procedure of the motor vehicle according to the present invention.

The flow diagram in FIG. 10 illustrates operation of another embodiment of a system or method for controlling a starting and the subsequent vehicle acceleration procedure according to the present invention. This embodiment is substantially the same as the first discussed embodiment except the provision of new boxes S700, S710, S720, S730 and S810 in FIG. 10 instead of boxes S300, S310, S320, S340, S440, S450 and S460 in FIG. 6. Like reference numerals are used to designate like boxes throughout FIGS. 6 and 10.

With reference to FIG. 10, execution of the flow diagram is repeated at regular intervals. In box S700, the 4WD controller 8 determines whether or not a so-called low $\mu$ flag T$\mu$FLG is cleared. If, in box S700, the low $\mu$ flag T$\mu$FLG is cleared or reset (T$\mu$FLG=0), the logic goes to box S710. If, in box S700, the low $\mu$ flag T$\mu$FLG is set (T$\mu$FLG=1), the logic goes to box S730.

In box S710, the 4WD controller 8 determines whether or not an acceleration slip $\Delta F$ ($\Delta F=V_{WF}-V_{WR}$) is greater than a threshold value of 1 (km/h), for example. If this is the case, the 4WD controller 8 determines that the road surface coefficient friction $\mu$ is low and the logic goes to box S720. In box S720, the 4WD controller 8 sets a low $\mu$ flag T$\mu$FLG. If the acceleration slip $\Delta F$ is equal to or less than 1 km/h, the logic goes to box S330. In this case, the 4WD controller 8 determines that the road surface coefficient of friction $\mu$ is not low or high.

In box S710, the threshold value is equal to 1 km/h rather than 0 km/h to eliminate the possibility that a small difference in wheel speeds during turning or cornering might be regarded as occurrence of an acceleration slip.

After box S720, the logic goes to box S730. In box S730, the 4WD controller 8 determines based on information on shift position within the associated transmission whether or not a forward speed ratio less than the first seed ratio is established. In other words, it is determined, in box S720, whether or not the second speed is established. If the second speed ratio is established after a shift up from the first speed, the logic goes from box S730 to box S330.

In box S330, the 4WD controller 8 determines whether or not the vehicle speed $V_{car}$ is lower than or equal to the threshold vehicle speed of 5 km/h.

This section provides description on boxes S730 and S330. The threshold vehicle speed used in box S330 is one of vehicle speed values around which the transmission is scheduled to shift up from the first speed to the second speed. It is one of vehicle speed values around which the transmission stays in the first speed ratio under normal driving condition. Finding the second speed in box S730 means that the road surface with low coefficient of friction $\mu$ has allowed the road wheels 1L and 1R to spin quicker to elevate a vehicle speed indicative signal than expected.

In the same manner as the flow diagram in FIG. 6, the torque-based process is carried out in boxes S350 and S360, and the slip-based process is carried out in boxes S370, S380 and S390. After box S390, the logic goes to box S810. In box S810, the 4WD controller 8 resets the low μ flag TμFLG.

In the same manner as the flow diagram in FIG. 6, the logic flow from box S330 to box S350 to carry out the torque-based process when the vehicle speed $V_{car}$ is lower than or equal to the threshold value of 5 km/h. When the vehicle speed $V_{car}$ exceeds the threshold vehicle speed of 5 km/h, the logic goes from box S330 to S370 to carry out the slip-based process.

According to the embodiment illustrated in FIG. 10, if the road surface coefficient of friction μ is low, the feed-forward 4WD control continues until the transmission shifts up to the second speed to lower the drive torque even after the vehicle speed $V_{car}$ exceeds the threshold vehicle speed of 5 km/h.

In this embodiment, the acceleration slip and the transmission shift position are examined to determine whether or not driving situation justifies a change from the feed-forward 4WD control to the feed-back 2/4WD control. The feed-forward 4WD control applies drive torque to the rear road wheels 3L and 3R in response to the first or torque-based desired value TΔV that is determined in response to operator power demand (see boxes S350 and S360 in FIG. 10). The feed-back 2/4WD control applies drive torque to the rear road wheels 3L and 3R in response to the second or slip-based desired value TΔV that is determined in response to acceleration slip (see boxes S370, S380 and S390 in FIG. 10). The acceleration slip is inversely proportional to the road surface coefficient of friction μ, while a shift-up event in the transmission causes a drop in drive torque being applied to the rear road wheels 3L and 3R.

From the illustration in FIG. 10, it will be noted that, in the embodiment, a change from the feed-forward 4WD control to the 2/4WD control is justified when the vehicle speed $V_{car}$ exceeds the threshold vehicle speed after a shift up has taken place in the transmission.

In the flow diagram of FIG. 10, if it is required to eliminate hunting that may occur when the vehicle speed $V_{car}$ exceeds 5 km/h temporarily, a "NO" arm of the box S330 is separated from the box S370. The "NO" arm of the box S330 is connected to the box corresponding to the box S440 (see FIG. 6). The box corresponding to the box S440 is followed by the box, which corresponds to the box S450 (see FIG. 6). The box corresponding to the box S450 has its "NO" arm connected to the box S350. A "YES" arm of the box, which corresponds to the box S450, is connected to a box where the content of the counter CNT is cleared. The box S370 follows this box where the counter CNT is cleared.

Figure 11:
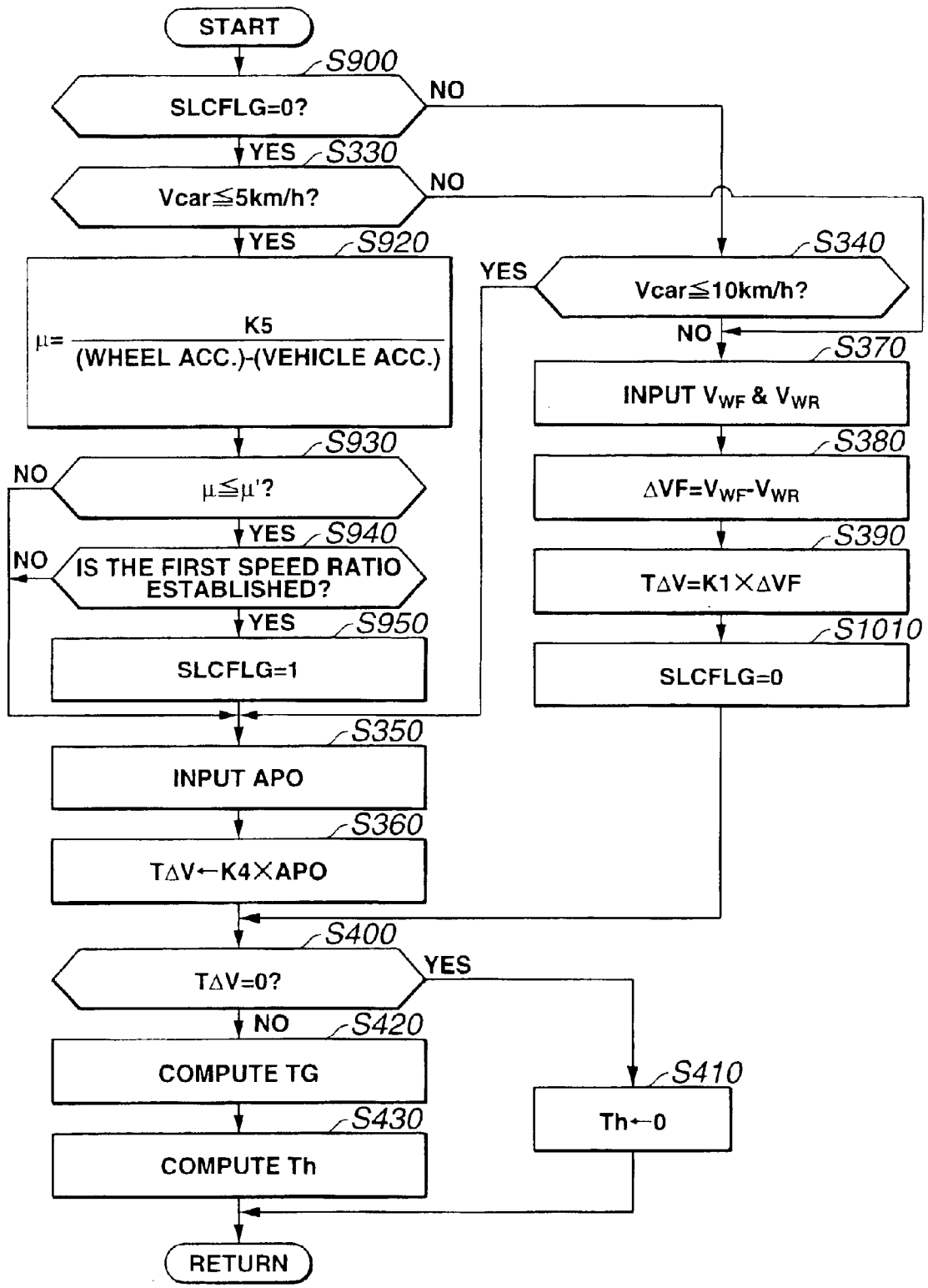
FIG. 11 is a flow diagram illustrating operation of another embodiment of a system or method for controlling a starting and the subsequent vehicle acceleration procedure of the motor vehicle according to the present invention.

The flow diagram in FIG. 11 illustrates operation of another embodiment of a system or method for controlling a starting and the subsequent vehicle acceleration procedure according to the present invention. This embodiment is substantially the same as the first discussed embodiment except the provision of new boxes S900, S920, S930, S940, S950 and S1010 in FIG. 11 instead of boxes S300, S310, S320, S440, S450 and S460 in FIG. 6. Like reference numerals are used to designate like boxes throughout FIGS. 6 and 11.

With reference now to FIG. 11, execution of the flow diagram is repeated at regular intervals. In box S900, the 4WD controller 8 determines whether or not a switch flag SLCFLG is cleared. If, in box S900, the switch flag SLCFLG is cleared or reset (SLCFLG=0), the logic goes to box S330. If, in box S700, the low μ flag TμFLG is set (SLCFLG=1), the logic goes to box S340.

In box S330, the 4WD controller determines whether or not the vehicle speed $V_{car}$ is lower than or equal to the threshold vehicle speed α of 5 km/h. If this is the case, the logic goes to box S920. If this is not the case the logic goes to the slip-based process including boxes S370, S380, and S390.

In box S340, the 4WD controller determines whether or not the vehicle speed $V_{car}$ is lower than or equal to the elevated threshold vehicle speed α of 10 km/h. If this is the case, the logic goes to the torque-based process including boxes S350 and S360. If this is not the case the logic goes to the slip-based process including boxes S370, S380, and S390.

In box S920, the 4WD controller 8 estimates or calculates a road surface coefficient of friction μ, which is expressed as, $$\mu = \frac{K5}{(WHEEL ACC.) - (VEHICLE ACC.)} \qquad (14)$$

where:
K5 is the gain.

In the next box S930, the 4WD controller 8 determines whether or not the road surface coefficient of friction μ is lower than or equal to a threshold coefficient of friction μ' (=0.2, for example). If this is the case, the logic goes to box S940. If this is not the case, the logic goes to the torque-based process including boxes S350 and S360.

In box S940, the 4WD controller 8 determines whether or not the first speed is established in the transmission. If this is the case, the logic goes to box S950. If this is not the case, the logic goes to box S350 of the torque-based process.

The threshold vehicle speed of 5 km/h used in box S330 is immediately lower than a vehicle speed at which a shift up is scheduled to take place under normal condition. In box S940, finding that the first speed is established means that the shift-up has not yet took place. In box S940, finding that the first speed is not established means that the shift-up has took place.

In box S950, the 4WD controller 8 sets the switch flag SLCFLG (SLCFLG=1). Immediately after setting the switch SLCFLG, the elevated threshold vehicle speed of 10 km/h is set for comparison with the vehicle speed $V_{car}$ in box S340.

This switch flag SLCFLG is reset in box S1010 during execution of the slip-based process including boxes S370, S380 and S390.

According to the embodiment, when the friction coefficient of friction μ is low, the elevated threshold vehicle speed of 10 km/h is set if no shift-up from the first speed takes place when the vehicle speed $V_{car}$ is lower than or equal to the threshold vehicle speed α of 5 km/h.

In the embodiment shown in FIG. 11, the road surface coefficient of friction μ, the transmission shift position, and the vehicle speed $V_{car}$ are examined to determine whether or not driving situation justifies a change from the feed-forward 4WD control to the feed-back 2/4WD control. The feed-forward 4WD control applies drive torque to the rear road wheels 3L and 3R in response to the first or torque-based desired value TΔV that is determined in response to operator power demand (see boxes S350 and S360 in FIG. 11). The feed-back 2/4WD control applies drive torque to the rear road wheels 3L and 3R in response to the second or slip-based desired value TΔV that is determined in response to acceleration slip (see boxes S370, S380 and S390 in FIG. 11).

Figure 12:
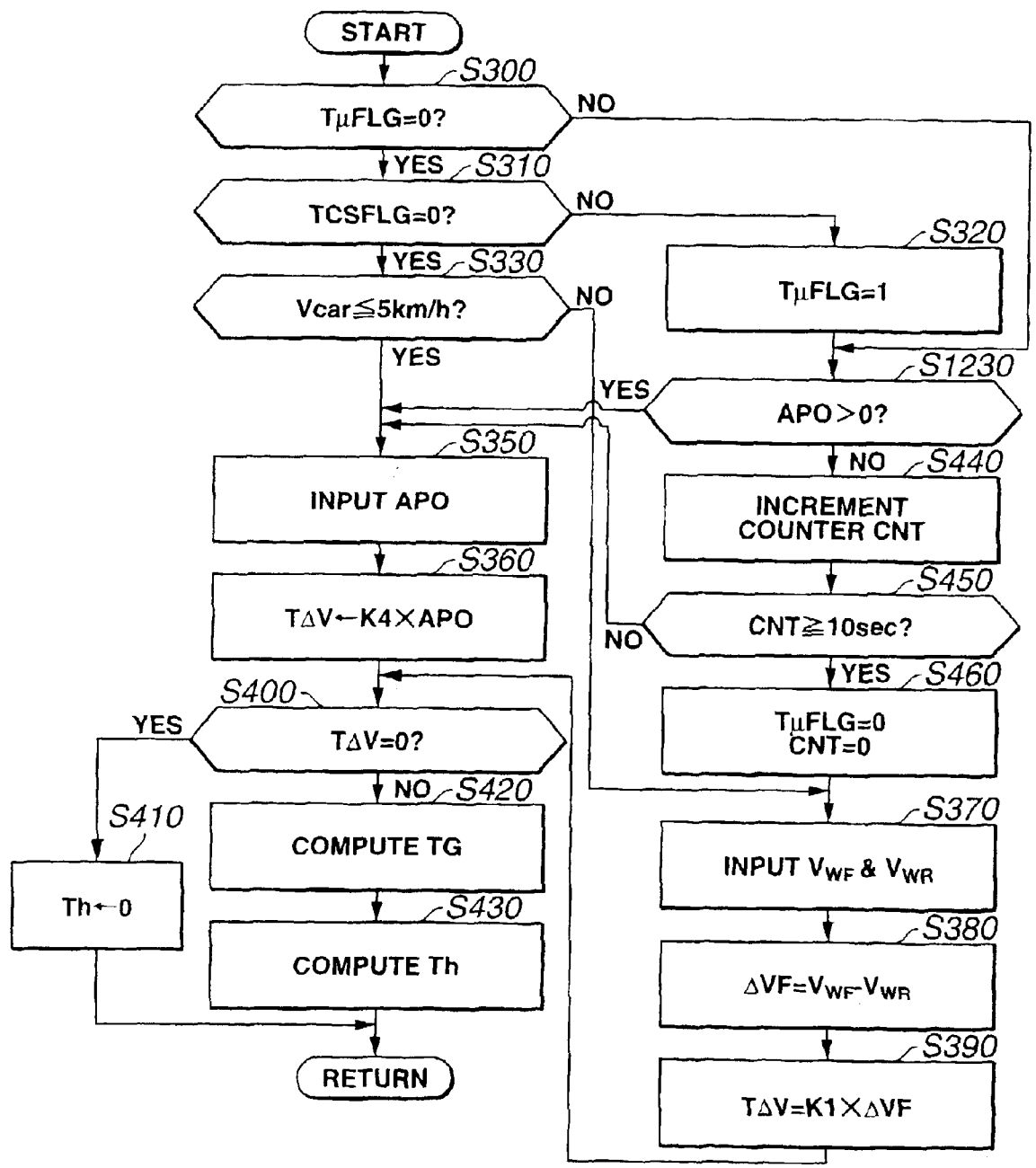
FIG. 12 is a flow diagram illustrating operation of another embodiment of a system or method for controlling a starting procedure of the motor vehicle according to the present invention.

The flow diagram in FIG. 12 illustrates operation of another embodiment of a system or method for controlling a starting and the subsequent vehicle acceleration procedure according to the present invention. This embodiment is substantially the same as the first discussed embodiment except the provision of a new box S1230 in FIG. 12 instead of box S340 in FIG. 6. The flow diagram in FIG. 12 is substantially the same as the flow diagram in FIG. 6 except the above-mentioned point. Like reference numerals are used to designate like boxes throughout FIGS. 6 and 12.

In FIG. 12, in box S1230, the 4WD controller 8 determines whether there is operator power demand by comparing the APO to a predetermined value of zero, for example. It is determined that there is operator power demand if the APO is greater than the predetermined value. If the operator power demand exists, the logic goes from box S1230 to the torque-based process including boxes S350 and S360. If the operator power demand is almost zero, the logic goes to box S440 of the count-up loop including boxes S440 and S450.

According to this embodiment, the feed-forward 4WD control continues in response to presence of operator power demand if the road surface coefficient of friction $\mu$ is low when the vehicle speed $V_{car}$ is lower than or equal to the threshold vehicle speed $\alpha$ of 5 km/h. Subsequently, if the operator power demand disappears continuously over the predetermined time period of 10 seconds, a change from the feed-forward 4WD control to the feed-back 2/4WD control is justified.

In this embodiment, the road surface coefficient of friction $\mu$ and operator power demand are examined to determine whether or not driving situation justifies a change from the feed-forward 4WD control to the feed-back 2/4WD control. The feed-forward 4WD control applies drive torque to the rear road wheels 3L and 3R in response to the first or torque-based desired value T$\Delta$V that is determined in response to operator power demand (see boxes S350 and S360 in FIG. 12). The feed-back 2/4WD control applies drive torque to the rear road wheels 3L and 3R in response to the second or slip-based desired value T$\Delta$V that is determined in response to acceleration slip (see boxes S370, S380 and S390 in FIG. 12). The acceleration slip is inversely proportional to the road surface coefficient of friction $\mu$, while a shift-up event in the transmission causes a drop in drive torque being applied to the rear road wheels 3L and 3R.

In each of the embodiments, the motor vehicle is driven in all-wheel mode by applying torque to the road wheels 3L and 3R in response to the generator command c1 that is used as input of the voltage regulator 22 for the generator 7. The voltage regulator 22 adjusts generator field current Ith to a value indicated by the generator command c1. The 4WD controller 8 generates the command c1. In response to the command c1, the voltage regulator 22 adjusts generator field current Ifh, causing the generator 7 to output voltage V determined in box S650 in FIG. 8. The generator voltage V is determined as a function of the load torque Th, which is determined as explained before in connection with the flow diagram in FIG. 6. In this motor vehicle, therefore, the drive torque to be applied to the road wheels 3L and 3R can be adjusted by controlling the command c1.

The present invention is operable with various types of motor vehicle having different 4WD systems in type and design.

While the present invention has been particularly described, in conjunction with exemplary embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

This application claims the priority of Japanese Patent Application No. 2002-130257, filed May 2, 2002, disclosure of which is hereby incorporated by reference in its entirety.

What is claimed is:

1. A method for controlling a starting and subsequent vehicle acceleration procedure of a motor vehicle, by driving the vehicle in all-wheel mode by applying torque to a road wheel in response to a command, the method comprising:

comparing a predetermined variable that grows continuously during the starting and the subsequent vehicle acceleration procedure to a threshold value;

determining a first desired value of torque in response to operator demand;

determining a second desired value of torque in response to acceleration slip;

determining the command in response to the first desired value of torque when the predetermined variable is lower than or equal to the threshold value; and determining whether or not a driving situation justifies a change from determining the command in response to the first desired value of torque to determining the command in response to the second desired value of torque.

2. The method as claimed in claim 1, wherein the predetermined variable is the vehicle speed, and wherein the driving situation is determined by examining a road surface coefficient of friction and the vehicle speed.

3. The method as claimed in claim 1, wherein the predetermined variable is the vehicle speed, and wherein the driving situation is determined by examining a road surface coefficient of friction and a transmission ratio.

4. The method as claimed in claim 1, wherein the predetermined variable is the vehicle speed, and wherein the driving situation is determined by examining a threshold coefficient of friction, a transmission ratio, and the vehicle speed.

5. The method as claimed in claim 1, wherein the predetermined variable is the vehicle speed, and wherein the driving situation is determined by examining a road surface coefficient of friction, and operator power demand.

6. The method as claimed in claim 1, wherein the predetermined variable is the vehicle speed, and wherein establishing a threshold vehicle speed that is elevated as the road surface coefficient of friction drops and comparing the vehicle speed to the established threshold vehicle speed are required in determining whether or not a driving situation justifies the change.

7. The method as claimed in claim 6, wherein calculating an acceleration slip provides the road surface coefficient of friction.

8. The method as claimed in claim 1, wherein the predetermined variable is the vehicle speed, and wherein determining that a shift-up in transmission ratio has occurred when a road surface coefficient of friction is low is required in determining that a driving situation justifies the change.

9. The method as claimed in claim 1, wherein the predetermined variable is the vehicle speed, and wherein establishing an elevated threshold vehicle speed upon determination that a shift-up in transmission ratio has not yet occurred when a road surface coefficient of friction is low and comparing the vehicle speed to the established elevated threshold are required in determining whether or not a driving situation justifies the change.

10. The method as claimed in claim 1, wherein the predetermined variable is the vehicle speed, and wherein, when a road surface coefficient of friction is low, keeping the vehicle speed higher than the threshold value over a predetermined period of time is required in determining that driving situation justifies the change, whereby the determining the command in response to the first desired value of torque remains over the predetermined period of time.

11. The method as claimed in claim 1, wherein the predetermined variable is the vehicle speed, and wherein, when a road surface coefficient of friction is low, operator power demand is required in determining that a driving situation does not justify the change, whereby the determining the command in response to the first desired value of torque remains.

12. The method as claimed in claim 1, wherein the predetermined variable is the vehicle speed, wherein, when a road surface coefficient of friction is low, operator power demand is required in determining that a driving situation does not justify the change, whereby the determining the command in response to the first desired value of torque remains, and wherein, when the road surface coefficient of friction is low, uninterrupted absence of the operator power demand over a predetermined period of time is required in determining that a driving situation justifies the change, whereby the determining the command in response to the first desired value of torque remains over the predetermined period of time.

13. A system for controlling a starting and subsequent vehicle acceleration procedure of a motor vehicle, the motor vehicle having a first powertrain with an engine for driving the vehicle by applying torque to a first road wheel, comprising:
 a second powertrain with an electric motor for driving the vehicle in all-wheel mode by applying torque to a second road wheel in response to a command; and
 a controller operative to compare a predetermined variable that grows continuously during the starting and the subsequent vehicle acceleration procedure to a threshold value;
 determine a first desired value of torque in response to operator demand;
 determine a second desired value of torque in response to acceleration slip;
 determine the command in response to the first desired value of torque when the predetermined variable is lower than or equal to the threshold value;
 determine whether or not a driving situation justifies a change from determining the command in response to the first desired value of torque to determining the command in response to the second desired value of torque; and
 apply the command to the second powertrain.

14. The system as claimed in claim 13, wherein the second powertrain includes a source of electric power for energizing to the electric motors.

15. The system as claimed in claim 14, wherein the source of electric power includes a generator operatively connected to the engine.

16. The system as claimed in claim 15, wherein the second powertrain includes a voltage regulator for the generator, and wherein the voltage regulator adjusts field current of the generator in response to the command.

17. A system for controlling a starting and subsequent vehicle acceleration procedure of a motor vehicle, the motor vehicle having a first powertrain with an engine for driving the vehicle by applying torque to a first set of road wheels, comprising:
 a second powertrain drivingly connected to a second set of road wheels for driving the vehicle in 4WD by applying torque to the second set of road wheels in response to a command; and
 controller means for generating the command,
 wherein the controller means compares a predetermined variable that grows continuously during the starting and the subsequent vehicle acceleration procedure to a threshold value;
 wherein
 the controller means compares a predetermined variable that grows continuously during the starting and the subsequent vehicle acceleration procedure to a threshold value;
 the controller means determines a first desired value of torque in response to operator demand;
 the controller means determines a second desired value of torque in response to acceleration slip;
 the controller means performs a feed-forward 4WD control by determining the command in response to the first desired value of torque when the predetermined variable is lower than or equal to the threshold value;
 the controller means determines whether or not a driving situation justifies a change from performing the feed-forward 4WD control to performing a feed-back 2/4WD control by determining the command in response to the second desired value of torque; and
 the controller means applies the command to the second powertrain.

18. The system as claimed in claim 17, wherein the second powertrain includes an electric motor as a source of torque to be delivered to the second set of road wheels.

19. A system for controlling a starting and subsequent vehicle acceleration procedure of a motor vehicle, by driving the vehicle in all-wheel mode by applying torque to a road wheel in response to a command, the system comprising:
 a microprocessor based controller,
 the controller being operative to
 compare a predetermined variable that grows continuously during the starting and the subsequent vehicle acceleration procedure to a threshold value;
 determine a first desired value of torque in response to operator demand;
 determine a second desired value torque in response to acceleration slip;
 perform a feed-forward 4WD control by determining the command in response to the first desired value of torque when the predetermined variable is lower than or equal to the threshold value; and
 determine whether or not a driving situation justifies a change from performing the feed-forward 4WD control to performing a feed-back 2/4WD control by determining the command in response to the second desired value of torque.

* * * * *